(12) United States Patent
Yukawa et al.

(10) Patent No.: US 7,926,726 B2
(45) Date of Patent: Apr. 19, 2011

(54) SURVEY METHOD AND SURVEY SYSTEM

(75) Inventors: Mikio Yukawa, Kanagawa (JP); Kazue Hosoya, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 915 days.

(21) Appl. No.: 11/277,595

(22) Filed: Mar. 27, 2006

(65) Prior Publication Data
US 2006/0213987 A1    Sep. 28, 2006

(30) Foreign Application Priority Data

Mar. 28, 2005  (JP) ................................. 2005-091804

(51) Int. Cl.
*G06K 19/06*    (2006.01)
(52) U.S. Cl. ............................ 235/492; 235/487; 257/40
(58) Field of Classification Search .................. 235/375, 235/435, 440, 492, 487, 924; 340/534, 535; 257/27, 40
See application file for complete search history.

(56) References Cited

U.S. PATENT DOCUMENTS

| | | | |
|---|---|---|---|
| 3,833,894 A | | 9/1974 | Aviram et al. |
| 5,375,250 A | | 12/1994 | Van den Heuvel |
| 5,751,629 A | * | 5/1998 | Nova et al. .................. 506/33 |
| 5,821,513 A | * | 10/1998 | O'Hagan et al. ............ 235/383 |
| 6,121,544 A | * | 9/2000 | Petsinger .................... 174/353 |
| 6,340,588 B1 | | 1/2002 | Nova et al. |
| 6,528,815 B1 | | 3/2003 | Brown et al. |
| 6,683,802 B2 | | 1/2004 | Katoh |
| 6,794,220 B2 | * | 9/2004 | Hirai et al. ................. 438/99 |
| 6,847,047 B2 | | 1/2005 | VanBuskirk et al. |
| 6,878,961 B2 | * | 4/2005 | Lyons et al. ................ 257/40 |
| 6,950,331 B2 | | 9/2005 | Yang et al. |
| 6,977,389 B2 | | 12/2005 | Tripsas et al. |
| 7,050,326 B2 | | 5/2006 | Anthony |
| 7,181,225 B1 | * | 2/2007 | Moton et al. .............. 455/456.1 |
| 7,220,985 B2 | | 5/2007 | Cheung et al. |
| 7,274,035 B2 | * | 9/2007 | Yang et al. .................. 257/27 |
| 7,359,230 B2 | | 4/2008 | Sumida et al. |
| 7,475,813 B2 | * | 1/2009 | Swanson, Sr. .............. 235/383 |

(Continued)

FOREIGN PATENT DOCUMENTS

EP        1341186         9/2003

(Continued)

OTHER PUBLICATIONS

Ma et al., "Organic nonvolatile memory by controlling the dynamic copper-ion concentration within organic layer," Applied Physics Letters, vol. 84, No. 24, Jun. 14, 2004, p. 4908-4910.*

(Continued)

*Primary Examiner* — Thien M. Le
*Assistant Examiner* — William M Anderson, Jr.
(74) *Attorney, Agent, or Firm* — Fish & Richardson P.C.

(57) ABSTRACT

A customer is made to have an object equipped with a chip (wireless chip) capable of wireless communication. Further, an antenna is arranged in each of an entrance and an exit of a saleroom in a store and a plurality of points, respectively, inside the saleroom of the store. When the customer approaches the entrance, exit, and plurality of points, positional information and time information are written from an antenna arranged in the approached point to the wireless chip. By reading information written in the wireless chip, a movement path or the like of the customer in the saleroom is judged. The needs of the customer are judged based on the result.

17 Claims, 24 Drawing Sheets

U.S. PATENT DOCUMENTS

| | | | |
|---|---|---|---|
| 7,499,305 B2 | 3/2009 | Nomura et al. | |
| 2002/0161651 A1* | 10/2002 | Godsey et al. | 705/22 |
| 2002/0178085 A1* | 11/2002 | Sorensen | 705/26 |
| 2003/0183699 A1 | 10/2003 | Masui | |
| 2004/0142211 A1* | 7/2004 | McCreery | 428/694 T |
| 2005/0006640 A1* | 1/2005 | Jackson et al. | 257/40 |
| 2005/0156197 A1* | 7/2005 | Tsutsui et al. | 257/200 |
| 2005/0174875 A1 | 8/2005 | Katoh | |
| 2005/0200476 A1* | 9/2005 | Forr et al. | 340/539.13 |
| 2005/0249975 A1* | 11/2005 | Sandberg et al. | 428/690 |
| 2006/0092072 A1* | 5/2006 | Steiner | 342/46 |
| 2006/0180647 A1* | 8/2006 | Hansen | 235/375 |
| 2006/0267068 A1 | 11/2006 | Sato et al. | |
| 2007/0164272 A1* | 7/2007 | Yang et al. | 257/40 |
| 2007/0194301 A1 | 8/2007 | Sezi et al. | |
| 2007/0200125 A1 | 8/2007 | Ikeda et al. | |
| 2007/0230235 A1 | 10/2007 | Abe et al. | |
| 2008/0048180 A1 | 2/2008 | Abe et al. | |

FOREIGN PATENT DOCUMENTS

| | | |
|---|---|---|
| EP | 1453088 | 9/2004 |
| JP | 2000-357177 A | 12/2000 |
| JP | 2001-345431 | 12/2001 |
| JP | 2003-036330 | 2/2003 |
| JP | 2003-256705 A | 9/2003 |
| JP | 2003-296667 A | 10/2003 |
| JP | 2004-021846 A | 1/2004 |
| JP | 2005-071252 A | 3/2005 |
| WO | WO-2004/015778 | 2/2004 |

OTHER PUBLICATIONS

Ouyang et al., "Organic Memory Device Fabricated Through Solution Processing", IEEE. vol. 93, No. 7, Jul. 2005, p. 1287-1296.*

Sutton, "Going Organic", UCLA Engineering Magazine, UCLA COllege of Engineering, Fall 2004, p. 8-9.*

Chu, et al., "High-performance organic thin-film transistors with metal oxide/metal bilayer electrode", Jun. 13, 2005, Applied Physics Letters 87, 193508, p. 1-3.*

* cited by examiner

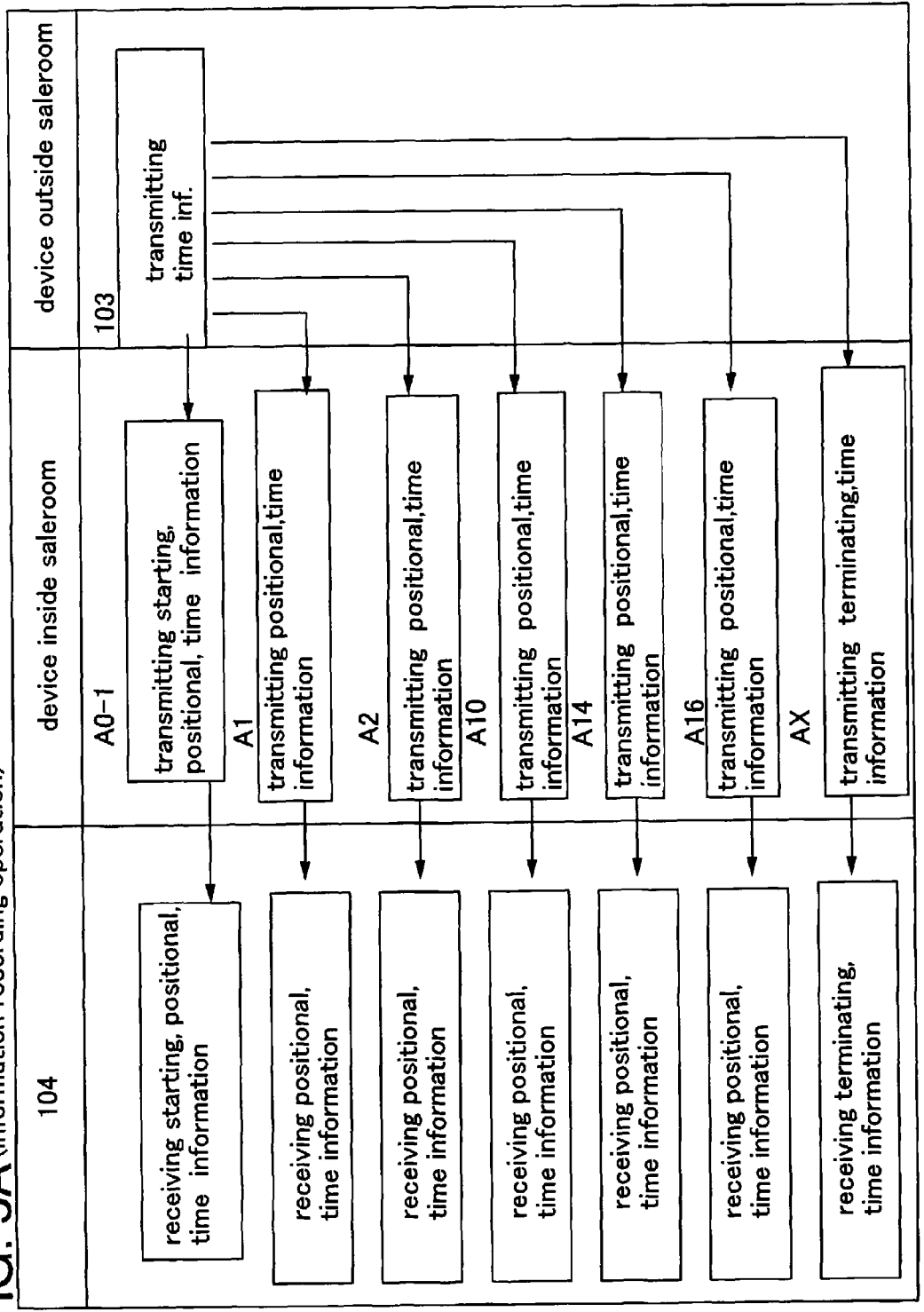
FIG. 5A (information recording operation)

information reading operation information erasing operation reading and erasing information operation reading and erasing information operation reading and erasing information operation 104 (arrangement 1)

104 (arrangement 3)

104 (arrangement 2)

104 (arrangement 4)

reading and erasing information operation

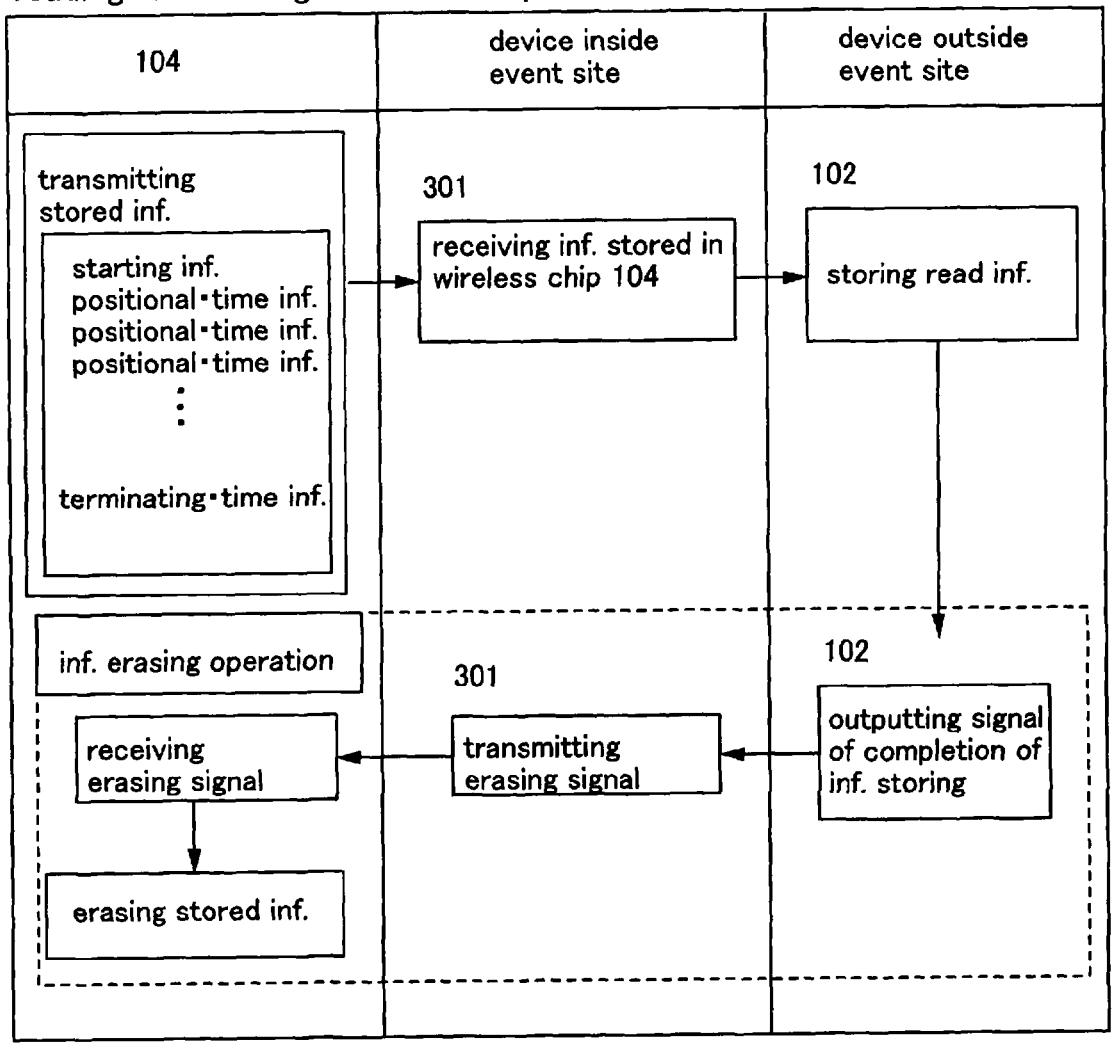

reading and erasing information operation

SURVEY METHOD AND SURVEY SYSTEM

BACKGROUND OF THE INVENTION

1. Field of the Invention

The present invention relates to a survey method in a store, an event site, or the like. Moreover, the invention relates to a survey system for conducting the survey method.

2. Description of the Related Art

There is a method of conducting a survey for perceiving the needs of a customer to a customer coming to a store or an event site (refer to Patent Document 1: Japanese Patent Laid-Open No. 2003-36330 (refer to FIG. 1 and the like)).

SUMMARY OF THE INVENTION

However, a conventional survey method has a problem that some people coming to a store or an event site (also referred to as customer) do not answer survey entries. In addition, it is difficult to precisely judge the needs of a customer because of influence such as subjectivity or vanity of a customer.

Moreover, the invention mentioned in Patent Document 1 has a problem that an e-mail address of a customer is known to a person who conducts a survey.

A customer is made to have an object equipped with a wireless chip. Further, an antenna is arranged in a place such as an entrance or an exit of a saleroom, a shop, or an event site. Furthermore, an antenna is arranged at a plurality of points, respectively, of the place such as a saleroom, a shop, or an event site.

When a customer approaches an entrance, starting information, positional information of the entrance, and time information at the time of approaching the entrance are written from an antenna arranged in the entrance to the wireless chip. When a customer approaches an arbitrary point of a plurality of points, positional information of the point and time information at the time of approaching the point are written from an antenna arranged in the point to the wireless chip. When a customer approaches an exit, terminating information and time information at the time of reaching the exit are written from an antenna arranged in the exit to the wireless chip. Subsequently, information written in the wireless chip is read.

A wireless chip after information is read may be reused by erasing written information or may be disposable.

A time and a period of staying in a saleroom or a site, a movement path while staying, a period of staying at each point inside a saleroom or inside a site, or the like, of a customer can be known by reading information written in a wireless chip. By analyzing these pieces of information, the needs of a customer can be known.

Many samples can be collected because a customer is not troubled. Further, precise information is obtained by removing influence of subjectivity or vanity of a customer because a result of the unconscious movement of a customer is traced in detail. As a result, the needs of a customer can be precisely known.

Further, information is obtained as electronic information; therefore, analysis using the information is easily conducted. Furthermore, an e-mail address of a customer is not known to a person who conducts a survey. These and other objects, features, and advantages of the present invention will become more apparent upon reading of the following detailed description along with the accompanied drawings.

BRIEF DESCRIPTION OF THE DRAWING

In the accompanying drawings:

FIGS. 5A to 5C are views showing a survey method of a first embodiment mode;

DETAILED DESCRIPTION OF THE INVENTION

Embodiment modes according to the present invention are described in detail with reference to the drawings. However, it is easily understood by those skilled in the art that embodiments and details herein disclosed can be modified in various ways without departing from the purpose and the scope of the present invention. Therefore, it should be noted that the description of embodiment modes to be given below should not be interpreted as being limited the present invention.

Embodiment Mode 1

A first embodiment mode in a store will be shown. The explanation will be made with reference to FIG. 1, FIG. 3, FIGS. 5A to 5C, and FIGS. 10A and 10B.

Figure 1:
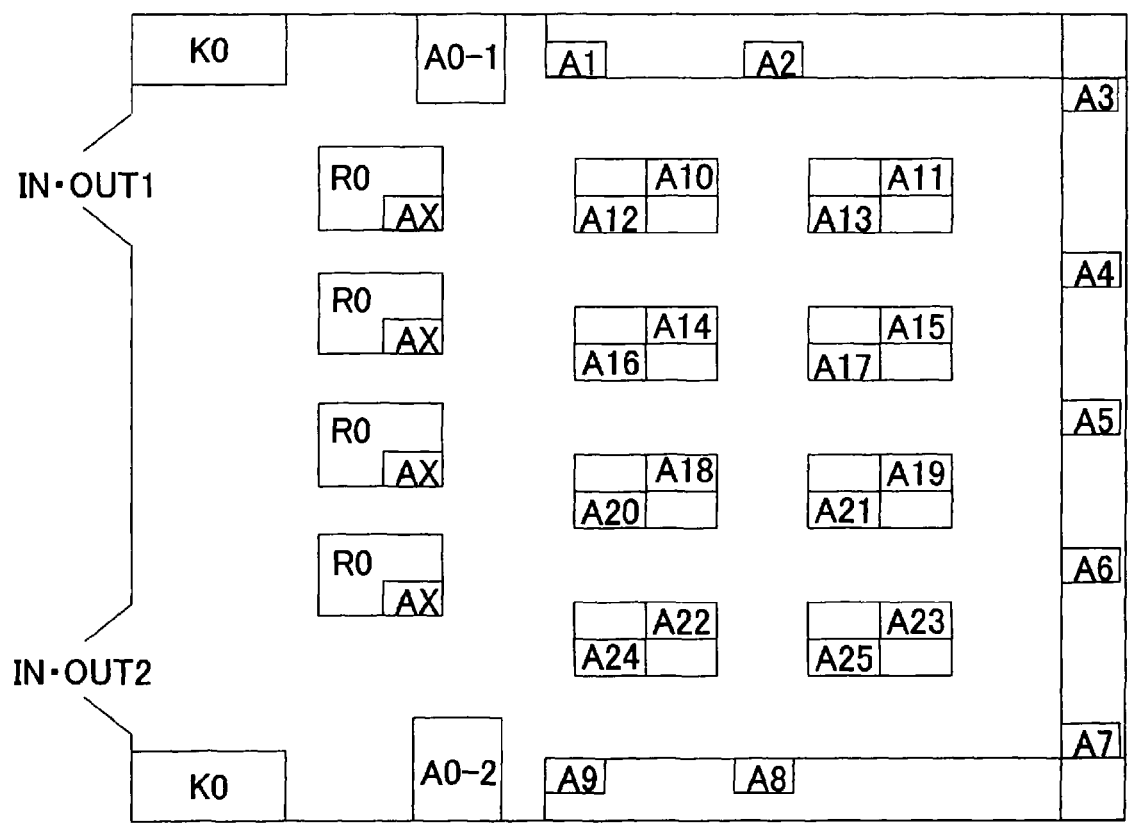
FIG. 1 is a view showing a structure of a store of a first embodiment mode.

FIG. 1 shows a layout drawing of a place such as a store of this embodiment mode. A person coming to the store enters and exits the store through a first doorway IN•OUT1 of the store and a second doorway IN•OUT2 of the store. An object such as a basket or a cart is equipped with a wireless chip and is arranged in a space for the basket or the cart K0 outside a saleroom of the store. Antennas A0-1 and A0-2 are arranged in the entrance of the saleroom, a plurality of antennas A1 to A24 is arranged at a plurality of points inside the saleroom, and an antenna AX is arranged in the exit of the saleroom. Further, a register device R0 is arranged in the exit of the saleroom.

FIG. 1 shows an example in which there are the first doorway IN•OUT1 of the store and the second doorway IN•OUT2 of the store as a doorway to the store; however, the present invention is not limited thereto, and the arbitrary number of doorways can be provided. Further, FIG. 1 shows an example in which the site of the store has a practically rectangular shape and two doorways to the store are arranged on a side of the rectangular shape. However, the shape of the site of the store and the arrangement of the doorway are not limited thereto. Further, the saleroom may be provided on multiple floors. Furthermore, the number and the arrangement of the antenna in the saleroom entrance, antenna in the saleroom, and antenna in the saleroom exit are not limited to the structure of FIG. 1, and the number and the arrangement can be arbitrary.

Figure 10A:
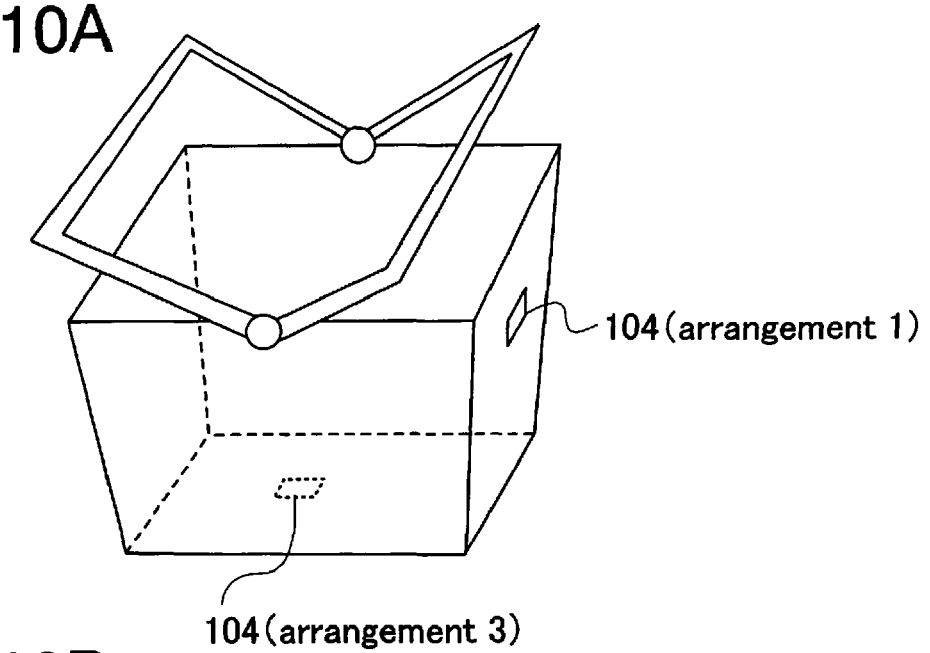
FIGS. 10A and 10B are views showing a structure of a basket and a cart.
Figure 10B:
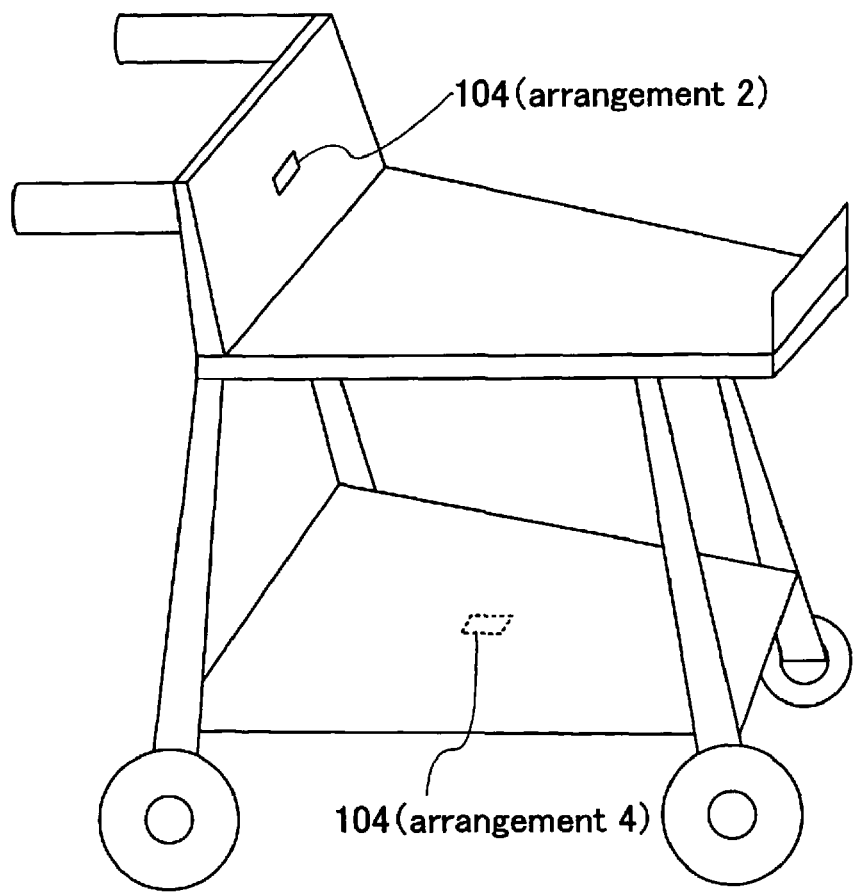

FIGS. 10A and 10B show one example of a basket (FIG. 10A) or a cart (FIG. 10B) equipped with a wireless chip. A wireless chip 104 can be attached to a side surface of the basket (indicated by arrangement 1 in FIG. 10A) or an upper part of the cart (indicated by arrangement 2 in FIG. 10B). The invention is not limited to the basket or the cart having the structure shown in FIGS. 10A and 10B, and the invention can be applied to a basket or a cart having an arbitrary shape. In the basket and the cart, the position equipped with the wireless chip is not limited to the arrangements 1 and 2 shown in FIGS. 10A and 10B. The wireless chip can be arranged in a position where information can be easily received from the antenna in accordance with the arrangement of the antennas A0-1 and A0-2 in the saleroom entrance, the antennas A1 to A24 in the saleroom, and the antenna AX in the saleroom exit. In addition, the wireless chip can be arranged in a position where information can be easily received from the antenna in accordance with communication distance (distance which can give/receive information to/from the wireless chip 104 by wireless communication). For example, the wireless chip 104 may be arranged in a bottom surface of the basket (indicated by arrangement 3 in FIG. 10A) or a portion of the cart facing a floor (indicated by arrangement 4 in FIG. 10B) in the case where the antenna is arranged close to the floor of the saleroom.

Figure 3:
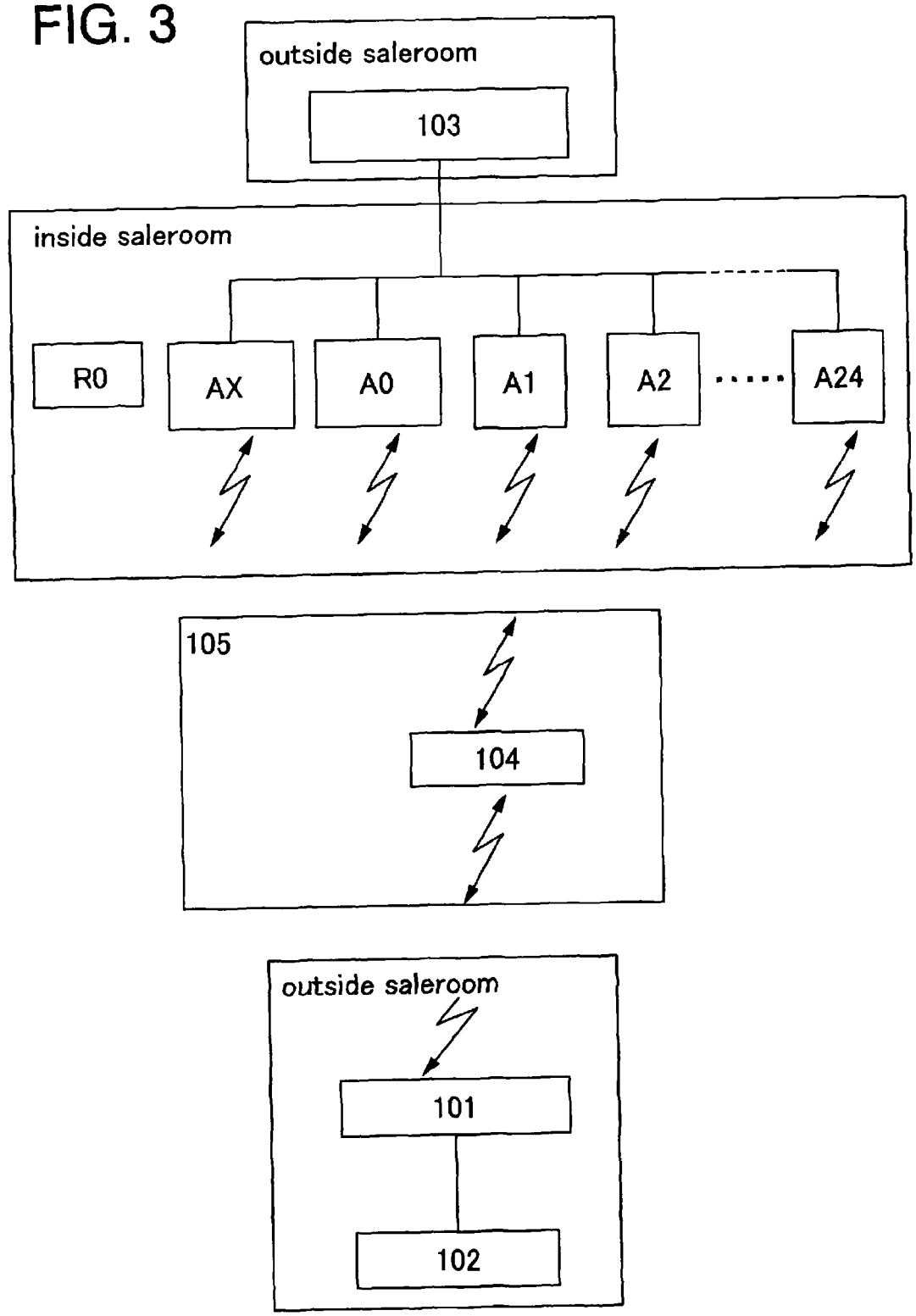
FIG. 3 is a view showing a survey system of a first embodiment mode.

FIG. 3 shows a survey system in a store having the structure shown in FIG. 1. The reference number in FIG. 1 will also be used in the explanation. Antennas A0-1 and A0-2 in a saleroom entrance, antennas A1 to A24 in a saleroom, antenna AX in a saleroom exit, and a register device R0 are arranged inside a saleroom. An information processor 101, a database 102, and a time control device 103 are arranged outside the saleroom. Further, a basket or a cart 105 equipped with a wireless chip 104 is used.

A person coming to the store approaches an entrance of the saleroom with the basket or cart 105. Then, the antenna A0 (A0-1 and A0-2) in the saleroom entrance writes starting information, positional information of the entrance, and time information at the time of approaching the entrance, to the wireless chip 104 by wireless communication. The person coming to the store approaches a point provided with the antenna, with the basket or cart 105. Then, an arbitrary antenna of the antennas A1 to A24 in the saleroom writes positional information of the point and time information at the time of approaching the point, to the wireless chip 104 by wireless communication. When the person coming to the store reaches the register device R0 with the basket or cart 105, the antenna AX in the saleroom exit writes terminating information and time information at the time of reaching the register device R0, to the wireless chip 104 by wireless communication. The information processor 101 has a means for reading information written to the wireless chip 104 by wireless communication. The database 102 has a means for storing information read by the information processor 101. In FIG. 3, giving/receiving of information by wireless communication is indicated by an arrow.

The time information, which is transmitted by each of the antennas A0-1 and A0-2 in the saleroom entrance, antennas A1 to A24 in the saleroom, and antenna AX in the saleroom exit, can be given by the time control device 103. The invention is not limited thereto, and each of the antennas A0-1 and A0-2 in the saleroom entrance, antennas A1 to A24 in the saleroom, and antenna AX in the saleroom exit may have the time control device. The time control device may be set in the saleroom. The time information may include information on year, month, and day.

When the person coming to the store reaches the register device R0 with the basket or cart 105, the antenna AX in the saleroom exit writes terminating information and time information at the time of reaching the register device R0. However, in addition to this, positional information of the register device R0 may be written to the wireless chip 104 by wireless communication. By writing the positional information of the register device R0 to the wireless chip 104, a register device used by the person coming to the store can be known in the case where a plurality of register devices are in the saleroom. Thus, a movement path of a customer in the saleroom can be known in more detail.

Figure 5B:
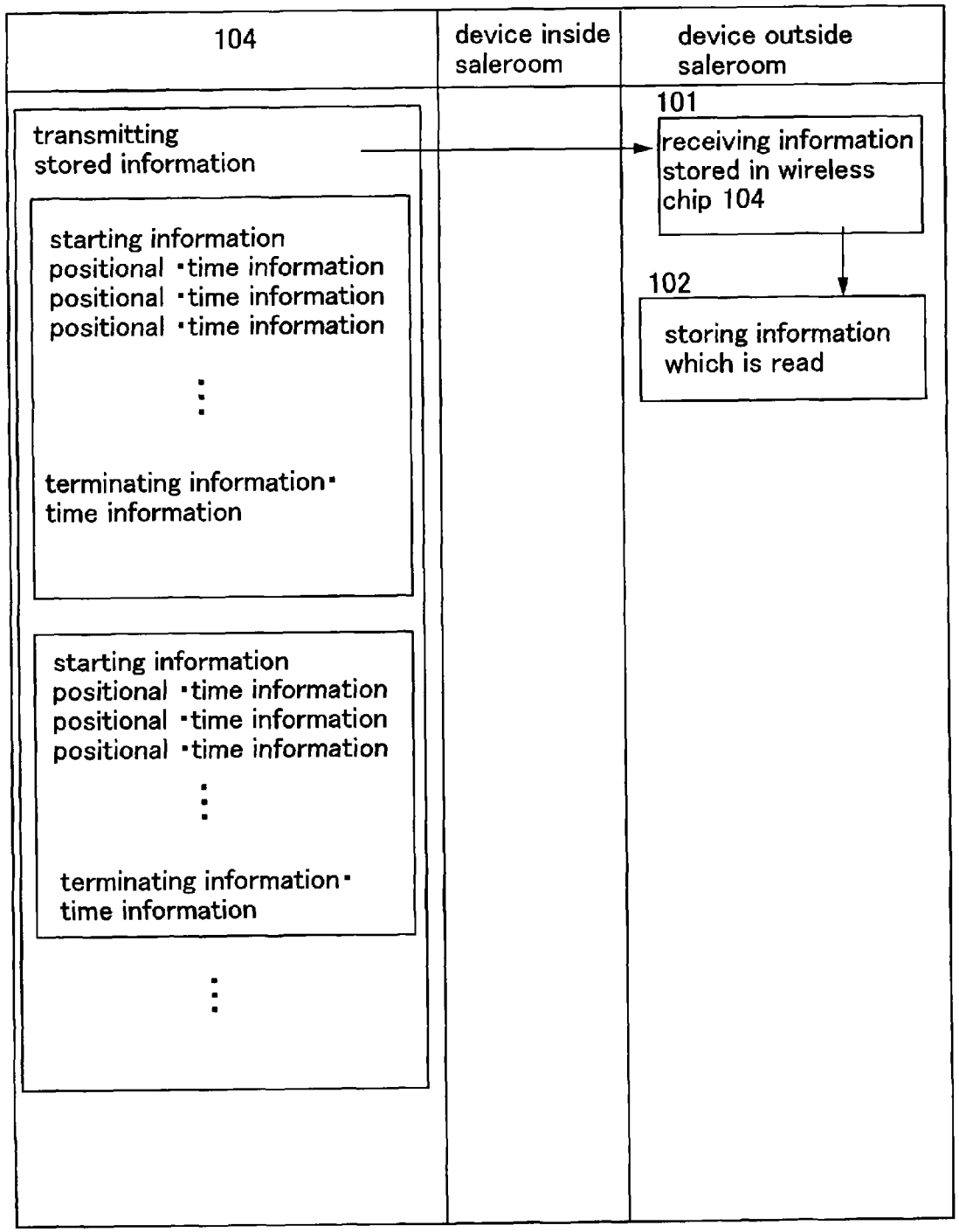
Figure 5C:
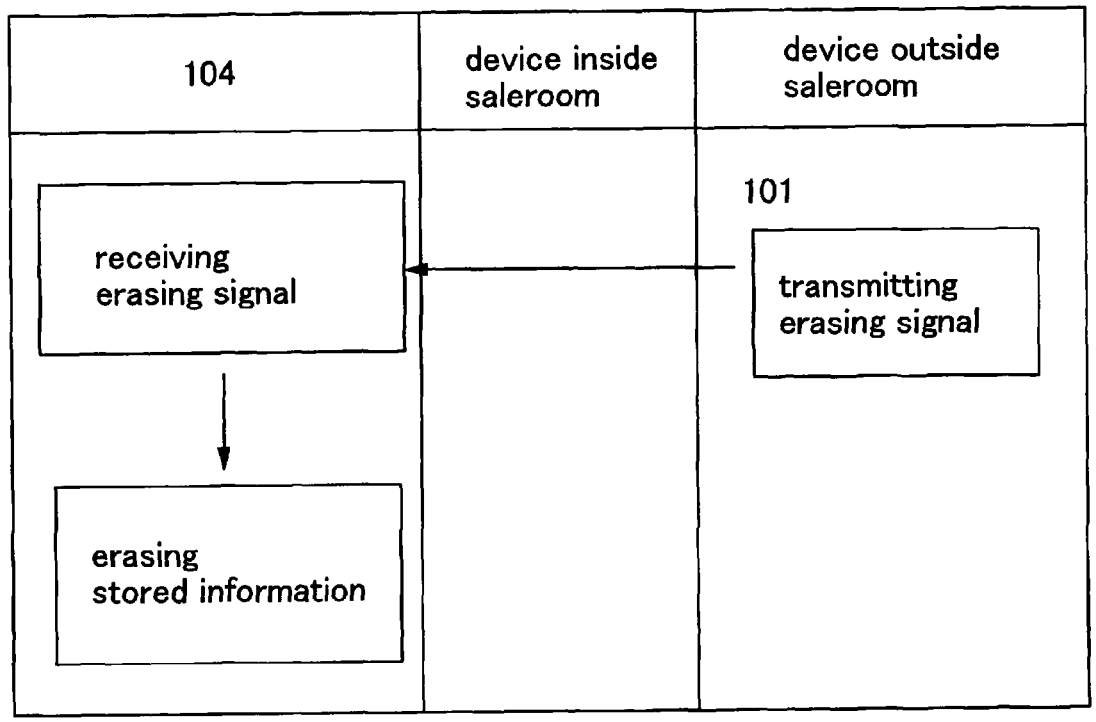

A survey method using the survey system shown in FIG. 3 will be explained with reference to a flow chart in FIGS. 5A to 5C. The reference numerals in FIG. 1 and FIG. 3 will also be used in the explanation.

First, a basket or cart 105 equipped with a wireless chip 104 is arranged outside a saleroom of a store.

Writing of information to the wireless chip 104 (referred to as information recording operation in FIG. 5A) will be explained.

When a person coming to the store approaches an entrance of the saleroom with the basket or cart 105, starting information, positional information of the entrance, and time information at the time of approaching the entrance are transmitted from an antenna (FIG. 5A shows an example of the antenna A0-1 in the saleroom entrance) arranged in the entrance by wireless communication. Information transmitted from the antenna A0-1 in the saleroom entrance is received by the wireless chip 104, and the starting information, the positional information, and the time information at the entrance are written to the wireless chip 104.

The person coming inside the store from the entrance moves with the basket or cart 105 and approaches a point in which an antenna A1 in the saleroom arranged inside the saleroom is arranged. Then, positional information of the point and time information at the time of approaching the point are transmitted from the antenna A1 in the saleroom to the wireless chip 104 by wireless communication. The information transmitted from the antenna A1 in the saleroom is received by the wireless chip 104, and the positional information and the time information at the point are written to the wireless chip 104.

Thereafter, the person coming to the store moves with the basket or cart 105 and approaches a point in which an antenna A2 in the saleroom, positional information of the point and time information at the time of approaching the point are transmitted from the antenna A2 in the saleroom to the wireless chip 104 by wireless communication. The information transmitted from the antenna A2 in the saleroom is received by the wireless chip 104, and the positional information and the time information at the point are written to the wireless chip 104.

Then, the person coming to the store moves with the basket or cart 105 and approaches a point in which an antenna A10 in the saleroom is arranged, positional information of the point and time information at the time of approaching the point are transmitted from the antenna A10 in the saleroom to the wireless chip 104 by wireless communication. The information transmitted from the antenna A10 in the saleroom is received by the wireless chip 104, and the positional information and the time information at the point are written to the wireless chip 104.

And then, the person coming to the store moves with the basket or cart 105 and approaches a point in which an antenna A14 in the saleroom is arranged, positional information of the point and time information at the time of approaching the point are transmitted from the antenna A14 in the saleroom to the wireless chip 104 by wireless communication. The information transmitted from the antenna A14 in the saleroom is received by the wireless chip 104, and the positional information and the time information at the point are written to the wireless chip 104.

Subsequently, the person coming to the store moves with the basket or cart 105 and approaches a point in which an antenna A16 in the saleroom is arranged, positional information of the point and time information at the time of approaching the point are transmitted from the antenna A16 in the saleroom to the wireless chip 104 by wireless communication. The information transmitted from the antenna A16 in the saleroom is received by the wireless chip 104, and the positional information and the time information at the point are written to the wireless chip 104.

Thus, the person coming inside the store from the entrance moves with the basket or cart 105 and approaches an arbitrary point of a plurality of points (in FIGS. 5A to 5C, points where the antennas A1 to A24 in the saleroom are arranged) arranged inside the saleroom. Then, positional information of the point and time information at the time of approaching the point are transmitted from the antenna in the saleroom, which is arranged in the point, to the wireless chip 104 by wireless communication. The information transmitted from the antenna in the saleroom is received by the wireless chip 104, and the positional information and the time information at the point are written to the wireless chip 104.

After that, when the person coming to the store reaches the register device R0 with the basket or cart 105, terminating information and time information at the time of reaching the register device R0 are transmitted from an antenna arranged in the register device R0 (antenna AX in the saleroom exit) to the wireless chip 104 through wireless communication. The information transmitted from the antenna AX in the saleroom exit is received by the wireless chip 104, and the terminating information and the time information at the point are written to the wireless chip 104. The antenna AX in the saleroom exit may have a structure in which positional information of the register device R0 is also written to the wireless chip 104 by wireless communication. By writing the positional information of the register device R0 to the wireless chip 104, a register device used by the person coming to the store can be known in the case where a plurality of register devices R0 are in the saleroom. Thus, a movement path of a customer in the saleroom can be known in more detail. It is to be noted that starting information and terminating information are not necessarily written to the wireless chip. In other words, in the antenna A0-1 in the saleroom entrance, starting information is not required to be written and only positional information and time information at the time of entering the saleroom may be written. Alternatively, in the antenna AX in the saleroom exit, terminating information is not required to be written and only positional information and time information at the time of exiting the saleroom may be written.

FIG. 5A shows an example in which the person coming to the store moves around the saleroom from the antenna A1 in the saleroom, antenna A2 in the saleroom, antenna A10 in the saleroom, antenna A14 in the saleroom, and antenna A16 in the saleroom in this order; however, the invention is not limited thereto. The invention can be applied to a case where a person coming to the store drops in the same point more than once and a case where the person coming to the store moves around the saleroom through an arbitrary movement path.

In the survey method of this embodiment mode, after information of the person coming to the store is stored by the above information recording operation, the basket or cart 105 having the wireless chip 104 in which the information is recorded is returned to the space for the basket or the cart K0 to be used by another person coming to the store. In other words, the above information recording operation is repeated in the wireless chip 104 attached to one basket or cart 105. Thus, information (starting information, time information, positional information, and terminating information) of a plurality (multiple groups) of people coming to the store is stored in the wireless chip 104.

An operation of reading information of the wireless chip 104 in which information is written as described above (referred to as information reading operation in FIG. 5B) will be explained. A person coming to the store, who have passed through the register device R0, leaves the basket or cart 105 outside the saleroom. The left basket or cart 105 is collected. By the information processor 101, information stored in the wireless chip 104 attached to the collected basket or cart 105 is read. The information which is read is stored in the database 102. The information reading operation can be conducted, for example, after closing the store.

An operation of erasing information recorded in the wireless chip 104 (referred to as information erasing operation in FIG. 5C) after information is read as described above will be explained. The information processor 101 transmits an erasing signal, and the wireless chip 104 which have received the erasing signal erases the information recorded in the wireless chip 104. After the information of the wireless chip 104 is erased, the basket or cart 105 equipped with the wireless chip 104 is arranged in the space for the basket or the cart K0 outside the saleroom.

Accordingly, the information recording operation, the information reading operation, and the information erasing operation are repeated again. In the case where the wireless chip 104 is made to be disposable, the information erasing operation can be omitted. In the case where the wireless chip 104 is made to be disposable, the wireless chip 104 attached to the basket or cart 105 is exchanged for a new one after conducting the information reading operation, and a basket or cart 105 in which the wireless chip has exchanged is arranged in the space for the basket or the cart K0.

It is to be noted that a person who uses the cart may use the basket in addition to the cart (namely, by putting the basket on the cart). Therefore, in the case of attaching the wireless chip 104 to both of the basket and the cart and reading information stored in both of the wireless chip 104 attached to the basket and the wireless chip 104 attached to the cart, information of the same person coming to the store is collected doubly. Thus, information for distinguishing the wireless chip 104 attached to the basket and the wireless chip 104 attached to the cart is preferably recorded in each wireless chip 104 in advance.

Embodiment Mode 2

A second embodiment mode in a store will be shown. The explanation will be made with reference to FIG. 2, FIG. 4, and FIGS. 6A and 6B.

The second embodiment mode is different from the first embodiment mode in terms of conducting an information reading operation and an information erasing operation by a register device.

Figure 2:
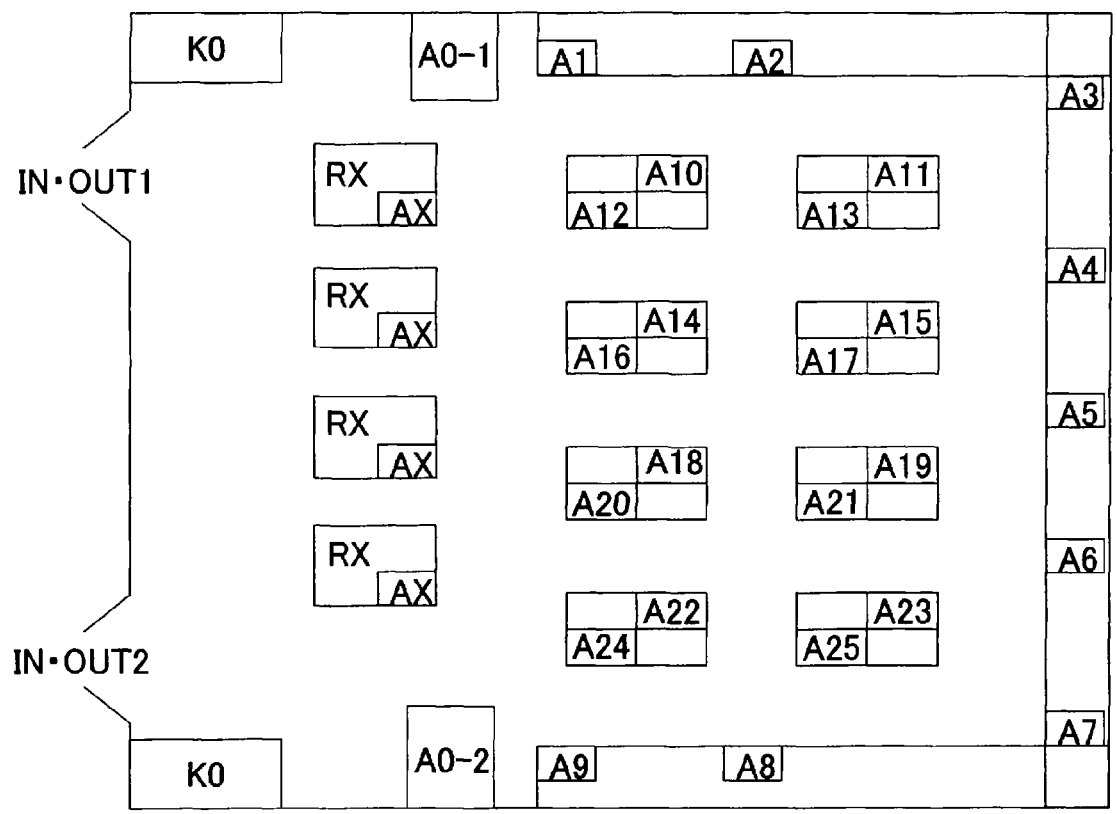
FIG. 2 is a view showing a structure of a store of a second embodiment mode.

FIG. 2 shows a layout drawing of a place such as a store of this embodiment mode. FIG. 2 in this embodiment mode is different in arranging a register device RX with respect to a register device R0 in FIG. 1 shown in the first embodiment mode. In FIG. 2, portions identical to those in FIG. 1 in the first embodiment mode are denoted by the same reference numerals and the descriptions are omitted.

The structure similar to the first embodiment mode can be used as a structure of an object such as a basket or a cart equipped with a wireless chip.

Figure 4:
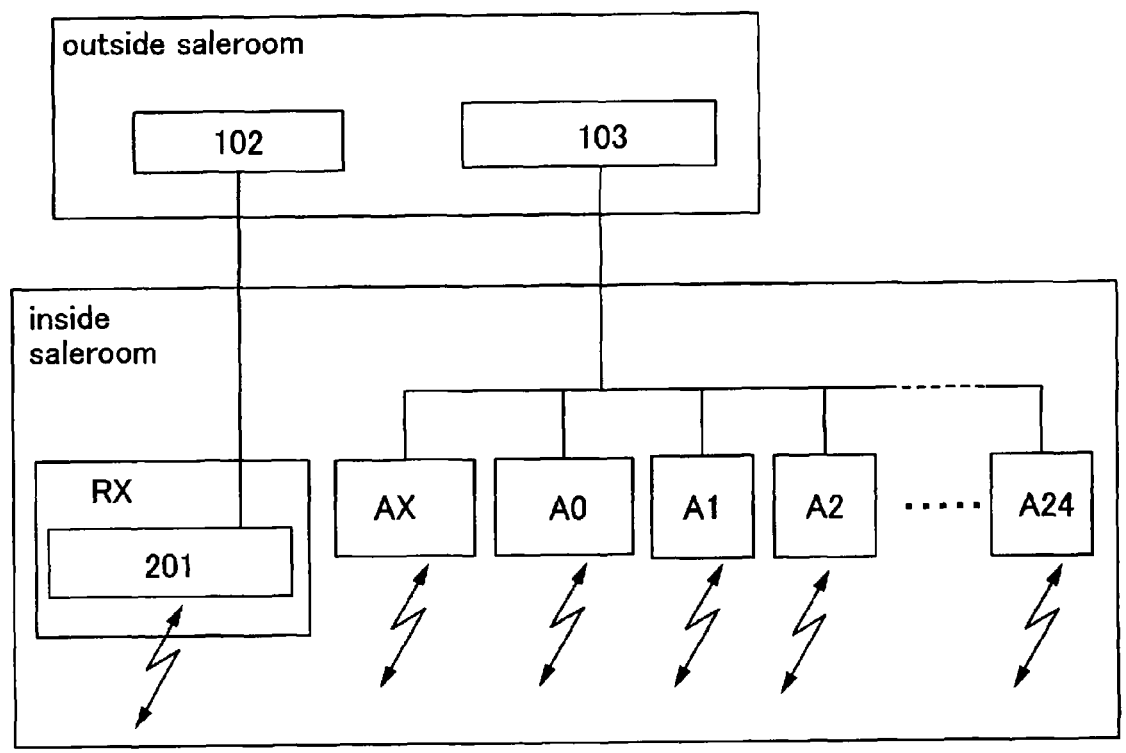
FIG. 4 is a view showing a survey system of a second embodiment mode.
Figure 4:
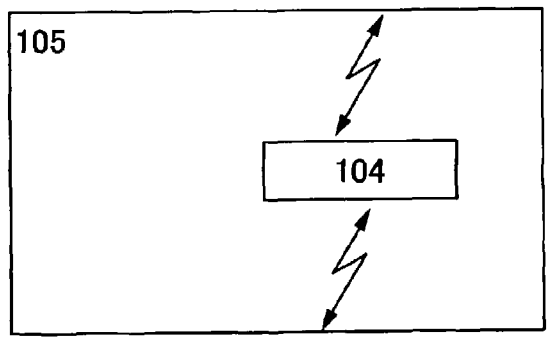

FIG. 4 shows a survey system in the store having a structure shown in FIG. 2. FIG. 4 in this embodiment mode is different in arranging a register device RX with respect to a register device R0 in FIG. 3 shown in the first embodiment mode. In FIG. 4, portions identical to those in FIG. 3 in the first embodiment mode are denoted by the same reference numerals and the descriptions are omitted.

The register device RX is provided with an information processor 201. The information processor 201 has a means for reading information stored in a wireless chip 104 and a means for erasing information stored in the wireless chip 104. A database 102 has a means for storing information read by the information processor 201.

A survey method using a survey system shown in FIG. 4 will be explained with reference to a flow chart in FIG. 6. The reference numerals in FIG. 2 and FIG. 4 will also be used in the explanation.

Figure 6A:
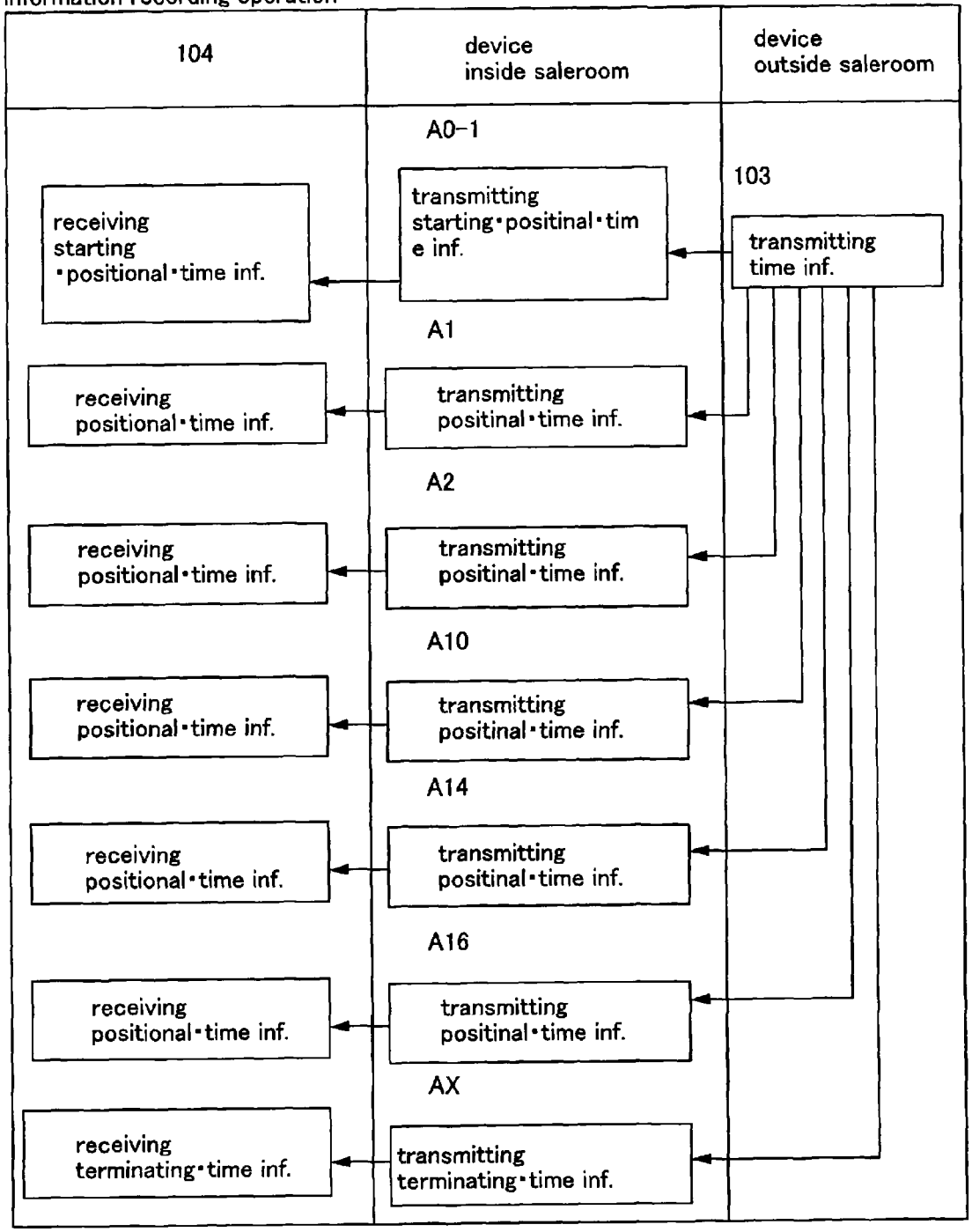
FIGS. 6A and 6B are views showing a survey method of a second embodiment mode.
Figure 6B:
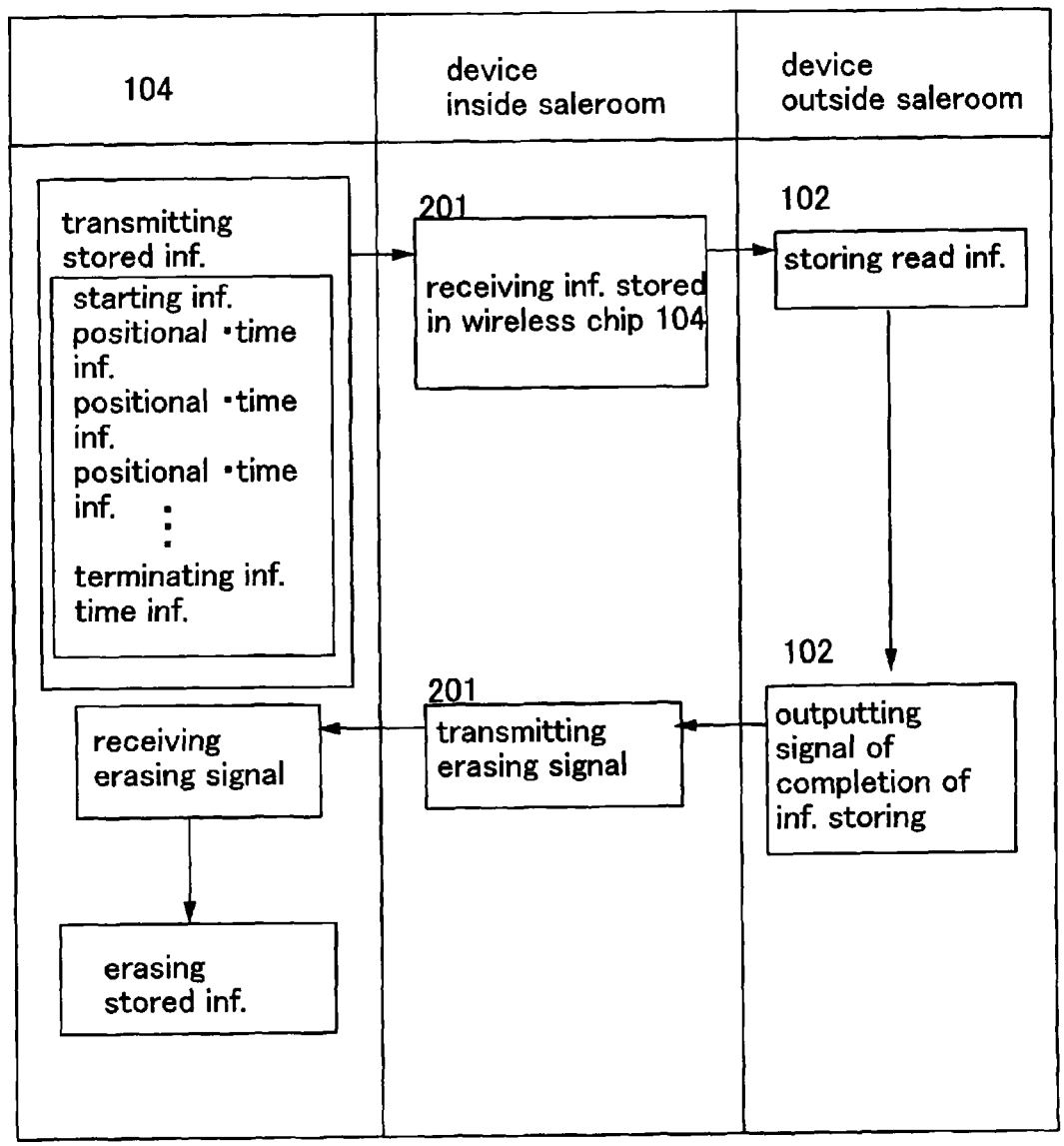

In FIG. 6A, an information recording operation is the same as a method of FIG. 5A in the first embodiment mode; therefore, the descriptions are omitted.

In the survey method in this embodiment mode, an information reading operation and an information erasing operation (refer to FIG. 6B) of the wireless chip 104 are conducted by the information processor 201 provided with the register device RX after movement information of a person coming to the store in a saleroom is recorded in the wireless chip 104 by an information recording operation. After conducting the information erasing operation, a basket or cart 105 equipped with the wireless chip 104 in which information is erased is carried to the outside of the saleroom by the person coming to the store. Thus, the basket or cart 105 is used by another person coming to the store, and again, the information recording operation, the information reading operation, and the information erasing operation are repeatedly conducted.

In the survey method in this embodiment mode, as for the wireless chip 104 attached to one basket or cart 105, the information reading operation and the information erasing operation are conducted each time a series of information recording operations is conducted. Therefore, information of the person coming to the store can be perceived more quickly compared with the first embodiment mode. In addition, information (starting information, time information, positional information, and terminating information) of one person (one group) coming to the store is recorded in the wireless chip 104. Therefore, it is necessary to use a wireless chip capable of rewriting information for the wireless chip 104. However, the wireless chip 104 is acceptable as long as only information of one person coming to the store is stored in the wireless chip 104; therefore, storage capacity required for the wireless chip 104 may be smaller compared with the first embodiment mode.

Embodiment Mode 3

Figure 7:
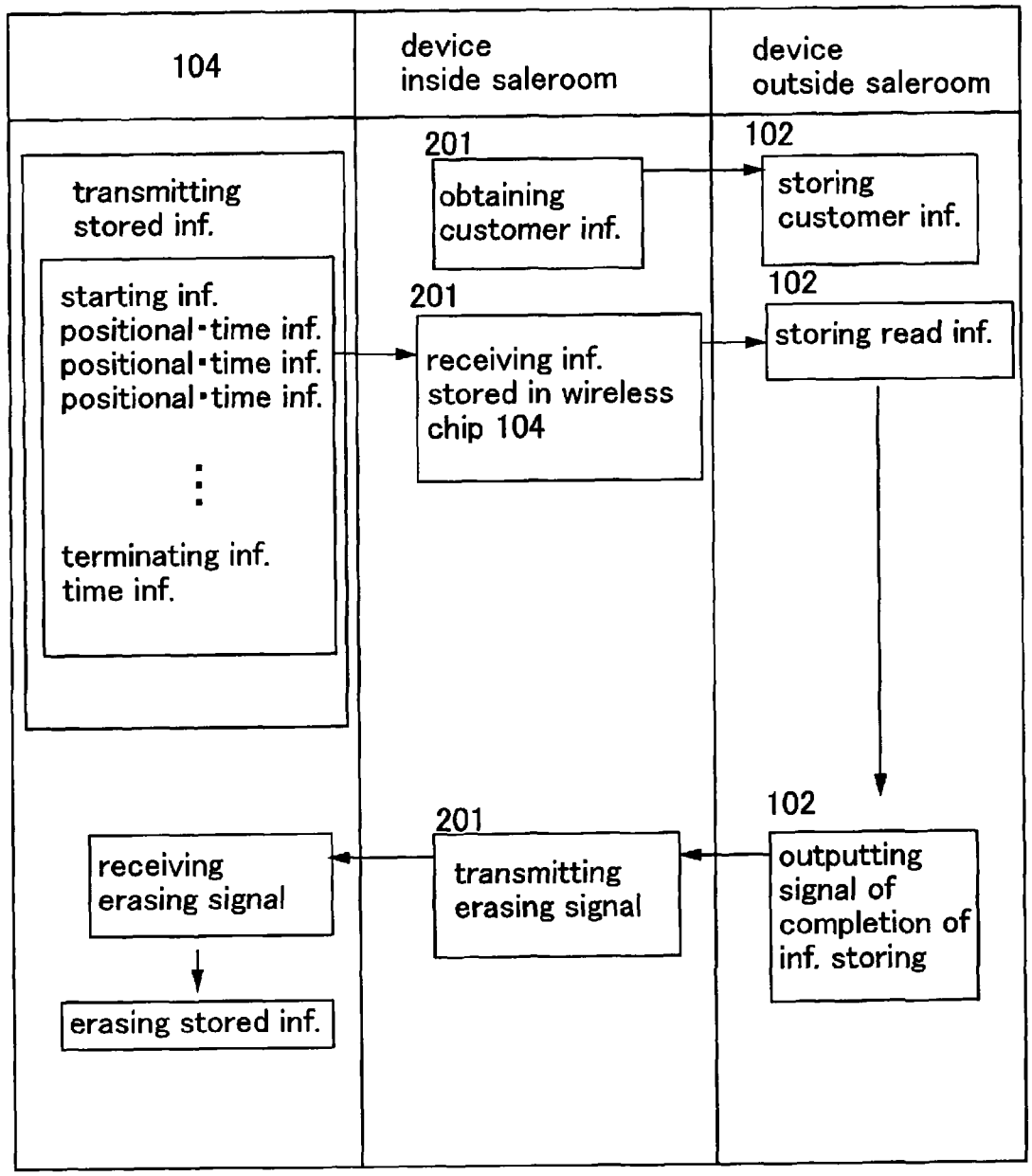
FIG. 7 is a view showing a survey method of a third embodiment mode.

A third embodiment mode in a store will be shown. The third embodiment mode is different from the second embodiment mode in terms of obtaining customer information (also referred to as personal information about a person coming to the store) in an information processor 201 arranged in a register device. The explanation will be made with reference to FIG. 7.

By a survey method in this embodiment mode, personal information about a person coming to the store is obtained in the information processor 201, then, the personal information is stored in a database 102 by connecting with information read from the wireless chip 104.

In a survey system in this embodiment mode, the information processor 201 has a means for reading information written in the wireless chip 104 and a means for obtaining personal information about a person coming to the store. The database 102 has a means for storing information read from the wireless chip 104 and the personal information by connecting with each other.

Here, customer information (personal information about a person coming to the store) denotes information such as sex, age, address, phone number, facsimile number, or occupation. Customer information may be obtained by inputting information on a customer observed and guessed by a store clerk on the moment, or may be obtained by reading information recorded in a member's card or the like.

The structure except for the above is the same as the second embodiment mode; therefore, the explanation is omitted. This embodiment mode can be freely combined with the second embodiment mode.

Embodiment Mode 4

Figure 8:
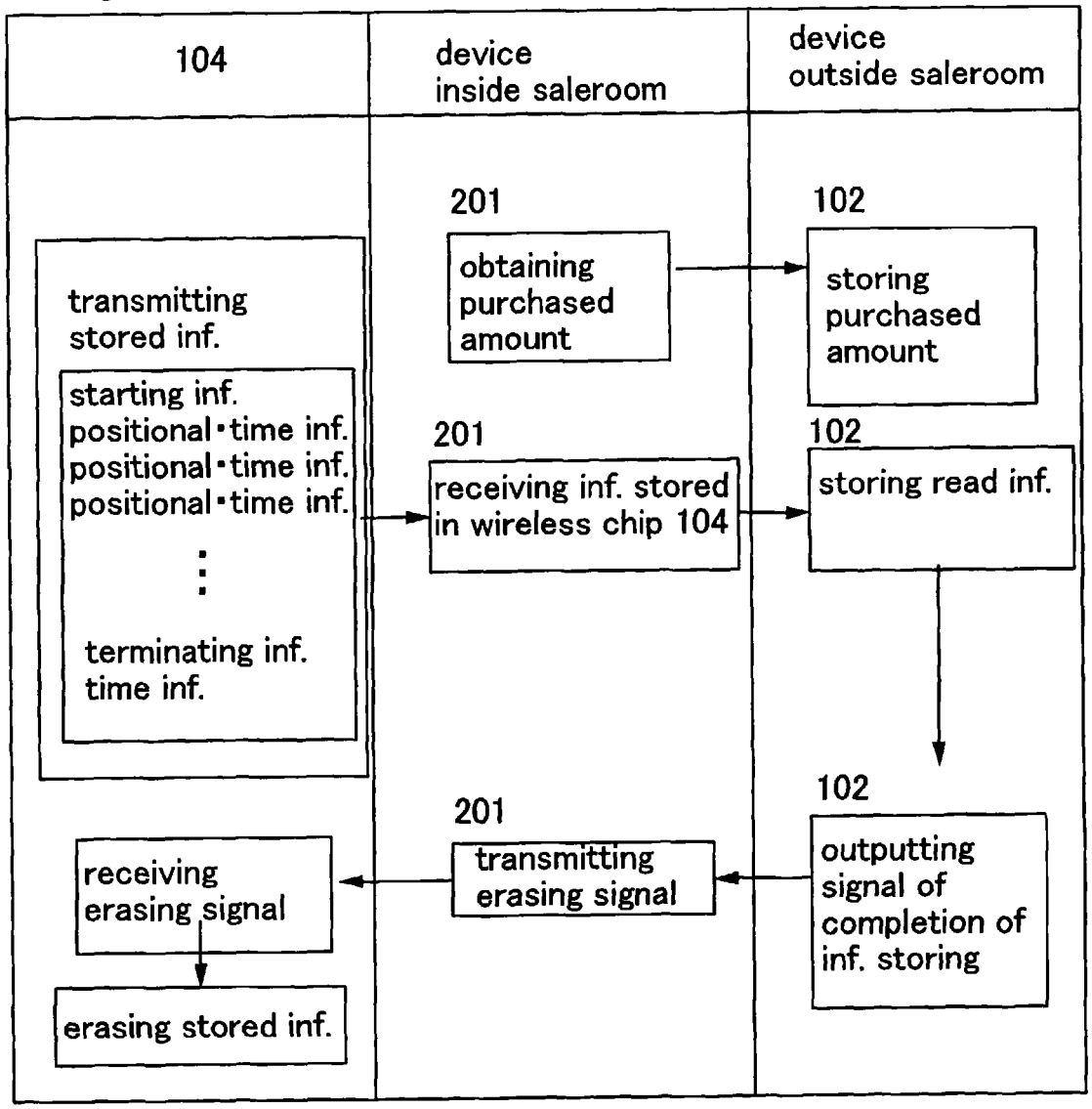
FIG. 8 is a view showing a survey method of a fourth embodiment mode.

A fourth embodiment mode in a store will be shown. The third embodiment mode is different from the second embodiment mode in terms of obtaining information on a purchased amount in an information processor 201 arranged in a register device. The explanation will be made with reference to FIG. 8.

By a survey method in this embodiment mode, information on a purchased amount of a person coming to the store is obtained in the information processor 201, then, the information on the purchased amount is stored in a database 102 by connecting with information read from a wireless chip 104.

In a survey system in this embodiment mode, the information processor 201 has a means for reading information written in the wireless chip 104 and a means for obtaining information on the purchased amount of the person coming to the store. The database 102 has a means for storing information read from the wireless chip 104 and information on the purchased amount by connecting with each other.

Here, information on a purchased amount of a person coming to the store denotes a total amount of a product purchased by the person coming to the store at time and date of conducting survey. Information on a purchased amount can be obtained by inputting the count result of the register device RX to the information processor 201.

The structure except for the above is the same as the second embodiment mode; therefore, the explanation is omitted.

This embodiment mode can be freely combined with the second embodiment mode and the third embodiment mode.

Embodiment Mode 5

Figure 9:
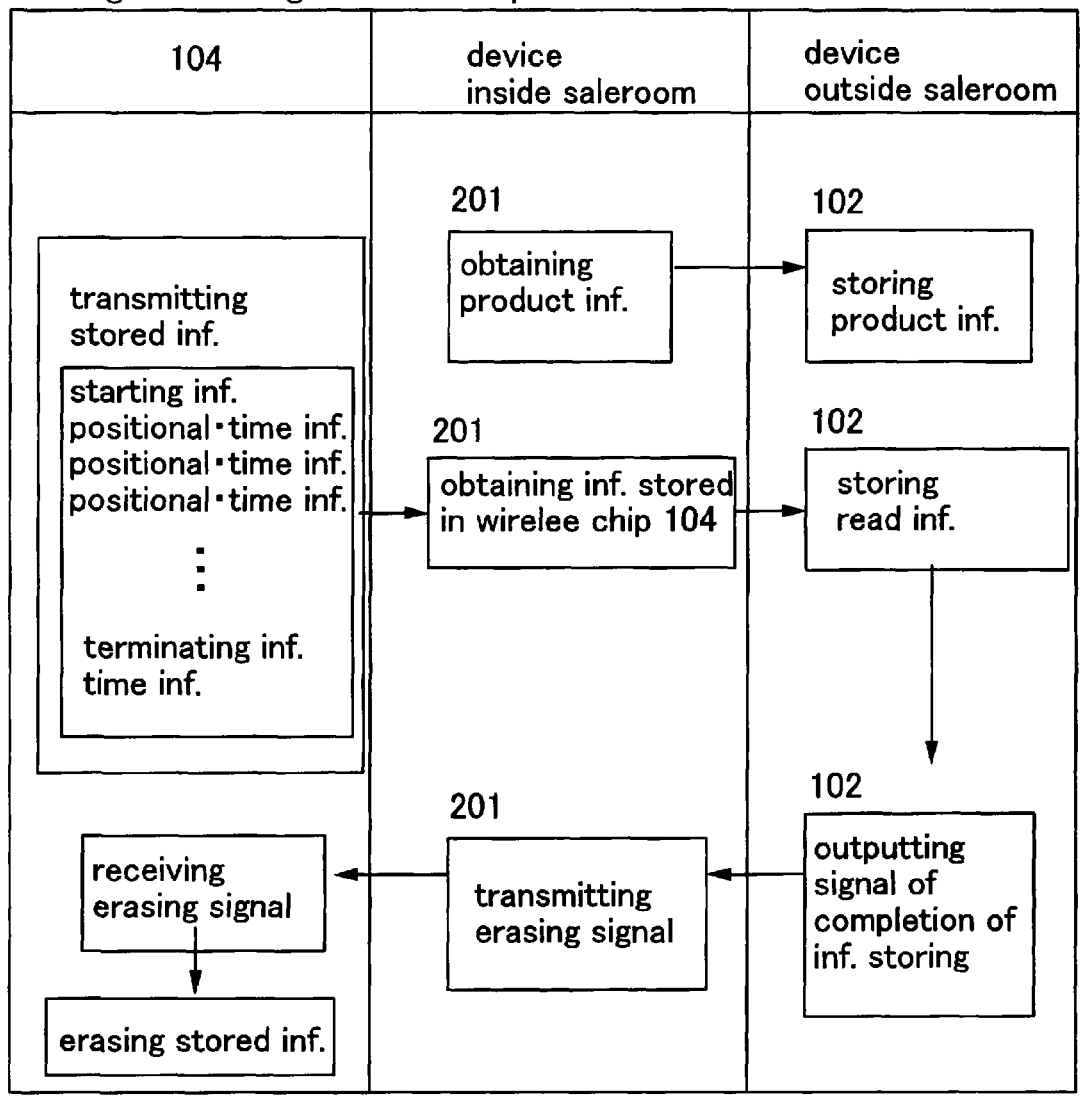
FIG. 9 is a view showing a survey method of a fifth embodiment mode.

A fifth embodiment mode in a store will be shown. The fifth embodiment mode is different from the second embodiment mode in terms of obtaining information on a product (also referred to as product information) in an information processor 201 arranged in a register device. The explanation will be made with reference to FIG. 9.

By a survey method in this embodiment mode, information on a product purchased by a person coming to the store is obtained in the information processor 201, then, the product information is stored in a database 102 by connecting with information read from a wireless chip 104.

In a survey system in this embodiment mode, the information processor 201 has a means for reading information written in the wireless chip 104 and a means for obtaining information on a product purchased by a person coming to the store. The database 102 has a means for storing information read from the wireless chip 104 and the product information by connecting with each other.

Here, the information of a product purchased by a person coming to the store denotes information on a product purchased by the person coming to the store at time and date of conducting survey, and information such as a type of a product, a model number, a production date, a production area, a production factory, a producer, or expiration date. The product information can be obtained by inputting information obtained by the register device RX to the information processor 201. The product information can be obtained by the register device RX by reading bar code attached to the product. The product information may be obtained by the register device RX by attaching a wireless chip for conducting wireless communication to the product and reading information of the wireless chip.

The structure except for the above is the same as the second embodiment mode; therefore, the explanation is omitted.

This embodiment mode can be freely combined with the second embodiment mode to the fourth embodiment mode.

For example, this embodiment mode can be combined with the third embodiment mode. At this time, personal information about a person coming to the store, a product purchased by the person coming to the store, a day when the product is purchased by the person coming to the store, and a point in which the person coming to the store drops in a saleroom on the day, are connected to each other and stored in the database 102. In the case where a person coming to the store insists on the defectiveness of a store (namely in the case of complaining), a manager of the store can judge more precisely whether or not the person coming to the store purchased the product at the manager's store by searching the database 102.

In the survey method and the survey system in this embodiment mode, a means such as a surveillance camera is not used; therefore, personal information which is not allowed by a person coming to the store is not obtained. Hence, privacy of a person coming to the store is not vainly invaded.

Embodiment Mode 6

A sixth embodiment mode in a store will be shown. The sixth embodiment mode is different from the second embodiment mode in terms of the following: product information is obtained in an information processor 201 arranged in a register device RX. Further, a database 102 outputs discount information based on obtained product information and information read from the wireless chip 104. Furthermore, the discount information is obtained to set a price of a product (discount price) in the information processor 201 arranged in the register device RX. The explanation will be made with reference to FIG. 11.

In a survey method of this embodiment mode, information of a product (referred to as product information G1 in FIG. 11) purchased by a person coming to a store is obtained in an information processor 201. Product information and a method for obtaining product information in the information processor 201 are the same as the fifth embodiment mode; therefore, the explanation is omitted. The database 102 stores the product information G1 and the information read from the wireless chip 104 by connecting with each other. The database 102 judges whether or not the product information G1 is consistent with information on a predetermined product (step 1111 in FIG. 11). The information on a predetermined product denotes product information on a product to be discounted, namely a type of a product, a model number, a production date, a production area, a production factory, a producer, an expiration date, or the like of a product to be discounted. The information on a predetermined product is stored in the database 102 in advance.

In the case where product information G1 is consistent with the information on a predetermined product in the step 1111 (yes in FIG. 11), the database 102 judges whether or not time information read from the wireless chip 104 is within a predetermined period. In other words, the database 102 judges whether or not a product of the product information G1 is purchased within a predetermined period (step 1112 in FIG. 11). In the case where the product is purchased within the predetermined period in the step 1112 (yes in FIG. 11), the database 102 outputs discount information on the product. The information processor 201 obtains the discount information, and a price of the product is set to be a price after a discount (discount price) based on the discount information.

In the case where the product information G1 is inconsistent with the information on a predetermined product in the step 1111 (no in FIG. 11), the database 102 outputs information telling that the product is not to be discounted (nondiscount information). Alternatively, in the case where the product is not purchased within a predetermined period in the step 1112 (no in FIG. 11), the database 102 outputs information telling that the product is not to be discounted (nondiscount information). The information processor 201 obtains the nondiscount information, and a price of the product is set to a nondiscount price (usual price) based on the nondiscount information.

An operation from obtaining the product information to obtaining discount information is referred to as an operation of obtaining discount information. In the case where a person coming to the store purchases a plurality of products, the operation of obtaining the discount information is repeated with respect to each product.

Whether or not a product is purchased within a predetermined period can be judged based on a time when a person coming to the store stays in a saleroom. In other words, the judgment can be conducted by judging whether or not time information between starting information and terminating information of information read from the wireless chip 104 is within a predetermined period. Alternatively, the judgment can be conducted based on a time when a person coming to the store passes through a predetermined point in the saleroom. In other words, the judgment can be conducted by judging whether or not time information of passing through a predetermined point of a plurality of points in which antennas A1 to A24 are arranged is within a predetermined period. At this time, whether or not the product is purchased within a predetermined period can be judged more precisely by setting a position where a predetermined product is arranged in the saleroom to be the point. It is effective especially in the case of a large saleroom or a saleroom provided on multiple floors.

In the survey method and the survey system in this embodiment mode, a means such as a surveillance camera is not used; therefore, personal information which is not allowed by a person coming to the store is not obtained. Hence, privacy of a person coming to the store is not vainly invaded.

The discount information can be set in accordance with product information. In other words, different discount information can be set to a product of the same type in accordance with its model number, production date, expiration date, or the like. The discount information includes not only information telling how much a discount rate is with respect to a usual price but also information telling how much a product is discounted from the usual price.

This embodiment mode can be applied to a service of reducing a price of a predetermined product purchased within a predetermined period, so-called discount hours. For example, this embodiment mode can be applied to discount hours conducted by setting fresh food of which a consuming date is a current day as a predetermined product and setting several minutes before closing the store as a predetermined period.

Figure 11:
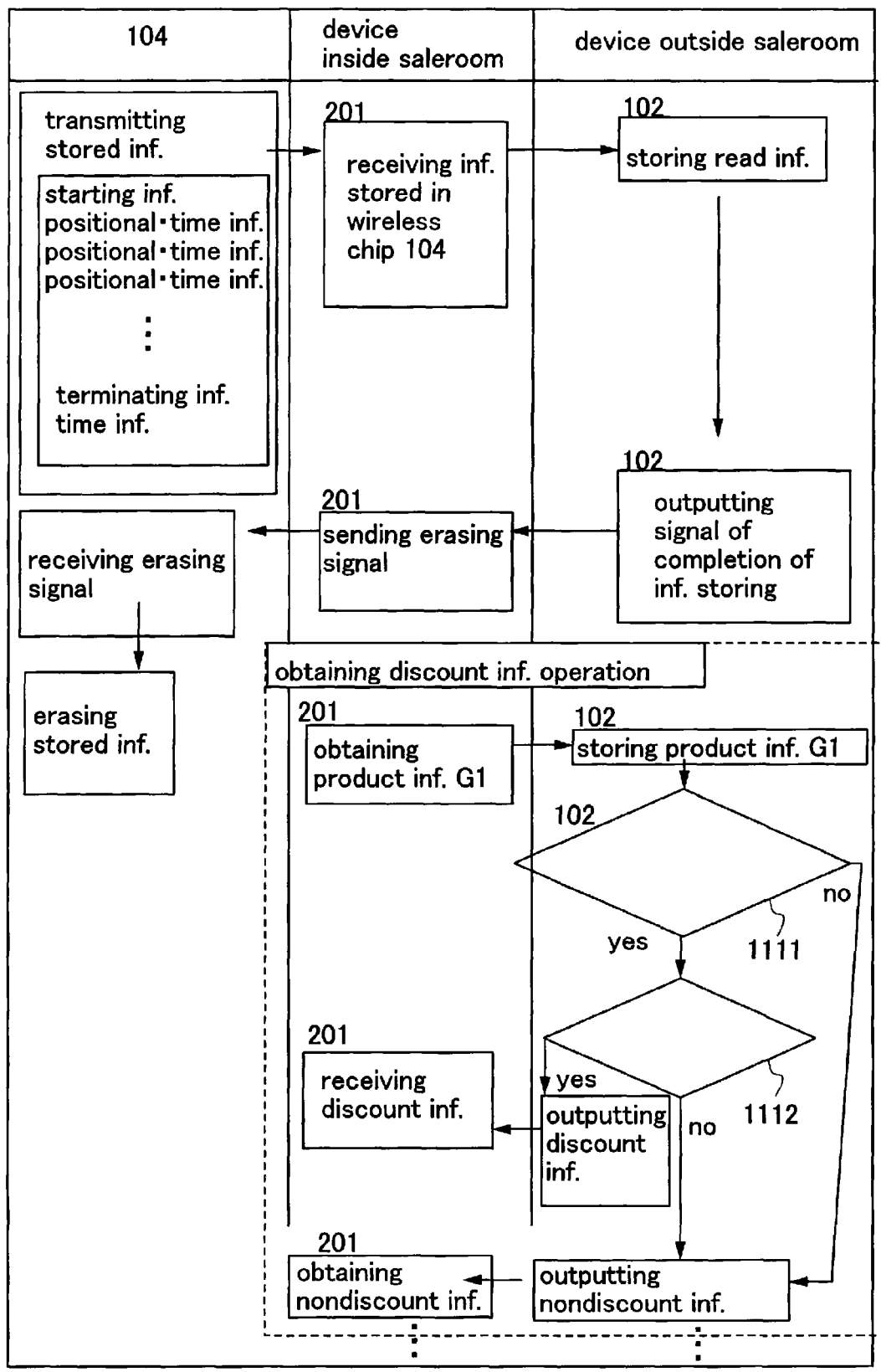
FIG. 11 is a view showing a survey method of a sixth embodiment mode.

In FIG. 11, a method for making a price of a product cheap in accordance with a time when a predetermined product is purchased is explained. However, the invention can be applied to a method for making a price of a product expensive in accordance with a time when a predetermined product is purchased.

The structure except for the above is the same as the second embodiment mode; therefore, the explanation is omitted.

This embodiment mode can be freely combined with the second embodiment mode to the fourth embodiment mode.

Embodiment Mode 7

A method will be explained in this embodiment mode, by which the needs of people coming to a place such as a store are analyzed and specification in a saleroom of the store (method of displaying a product, method of setting a passageway, method of placing an advertisement, method of arranging a register device, or the like) is changed using information obtained by a survey method of the first to sixth embodiment modes.

By analyzing information stored in the database 102, a movement path of a person coming to the store in a saleroom can be presumed. Thus, whether or not the person coming to the store shops effectively can be guessed by comparing obtained information on a movement path with an optimal movement path. In the case where it is guessed that the person coming to the store does not shop effectively, the specification of the saleroom is changed. Then, by conducting a survey method of the invention, an effect of changing the specification of the saleroom can be judged. By repeatedly and alternately conducting a survey and a change of the specification in the saleroom, the saleroom can be improved so that the person coming to the store can shop effectively. Accordingly, sales can be improved.

Further, a time at each point on a movement path of a person coming to the store in a saleroom can be known from information stored in the database 102; therefore, condition of rush in the saleroom, a product or advertisement in the store which attracts interest of a person coming to the store, or the like can be guessed. For example, in the case where there is a point in which a person coming to the store stays a long period, it is guessed that a product arranged in the point attracts interest of the person coming to the store. By contriving the arrangement of a product which attracts interest of the person coming to the store and further conducting a survey method of the invention, an effect of the contrivance can be judged. By repeatedly and alternately conducting a survey and a change of the arrangement of a product which attracts interest of the person coming to the store, sales can be improved.

In the survey method in the third embodiment mode to fifth embodiment mode, customer information, a purchased amount, and information on a purchased product, which are connected with the information, can be obtained in addition to information on a movement path of a person coming to the store and time information on the path. Therefore, customer information, a purchased amount, and information on a purchased product can also be used in addition to information on a movement path and time information on the path, in analyzing the needs of a person coming to the store. Thus, the needs of a person coming to the store can be analyzed in more detail.

In the survey method of the invention, many samples can be collected because a person coming to the store is not troubled. Further, precise information is obtained by removing influence of subjectivity or vanity of a person coming to the store because a result of the unconscious movement of a person coming to the store is traced in detail. As a result, the saleroom can be improved effectively. Furthermore, obtained information is obtained as electronic information; therefore, analysis using the information can be easily conducted.

Embodiment Mode 8

A case where the present invention is applied to a survey method and a survey system in an event site will be shown in an eighth embodiment mode.

Also in an event site, a survey system and a survey method can be conducted in the same manner as a survey system and a survey method in a place such as a store shown in the first embodiment mode to the seventh embodiment mode. This embodiment mode corresponds to a case in a store, where a person coming to a site corresponds to a person coming to a store; a site, a saleroom; an exit of an event site, a point in which a register device is arranged; and a ticket such as an entrance ticket, a member's card, or a coupon ticket, a basket or a cart. Therefore, the detail explanation will be omitted. A ticket is distributed to a person coming to a site.

Figure 12:
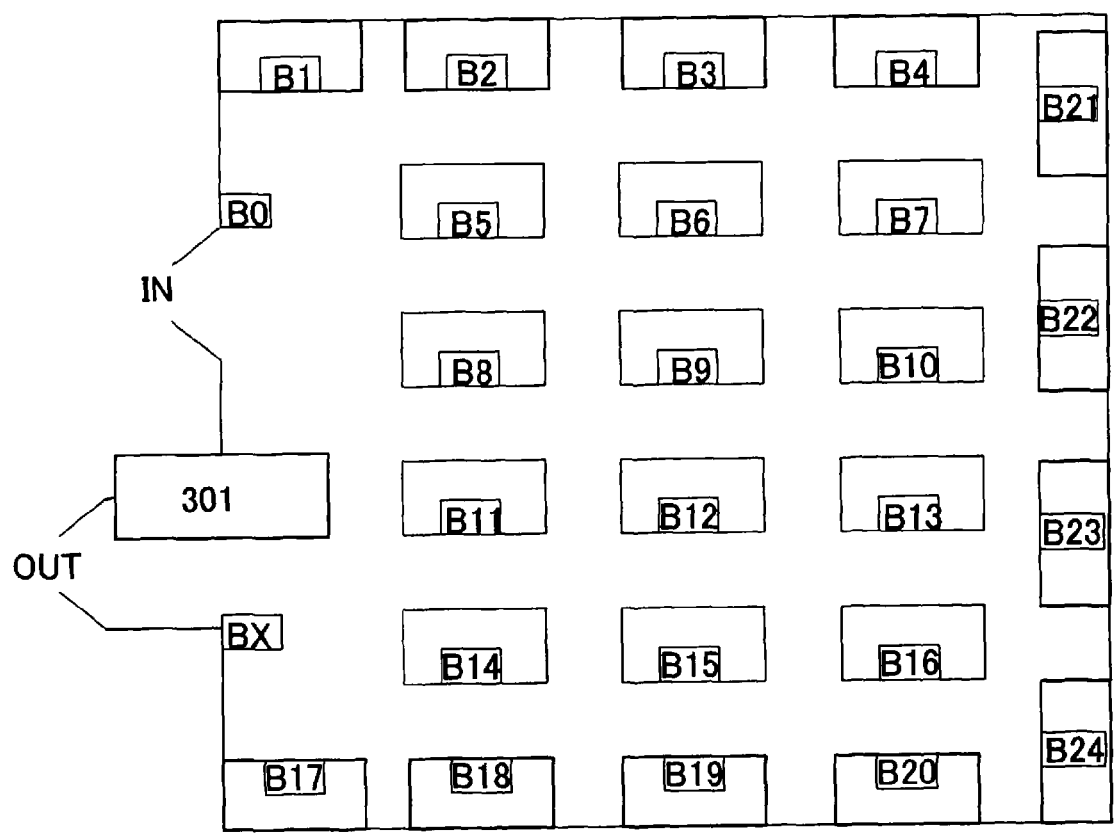
FIG. 12 is a view showing a structure of an event site of an eighth embodiment mode.

FIG. 12 is a layout drawing of an event site in the case where the second embodiment mode is applied to an event site. A person coming to the site enters and exits the event site through a site entrance IN of the event site. An object (ticket, entrance ticket, member's card, coupon ticket, or the like) is equipped with a wireless chip. An antenna B0 in a site entrance is arranged in the site entrance IN, a plurality of antennas B1 to B24 in a site are arranged in a plurality of points inside the event site, and an antenna BX in a site exit is arranged in a site exit OUT. Further, an information processor 301 is arranged in the site exit OUT.

Figure 13:
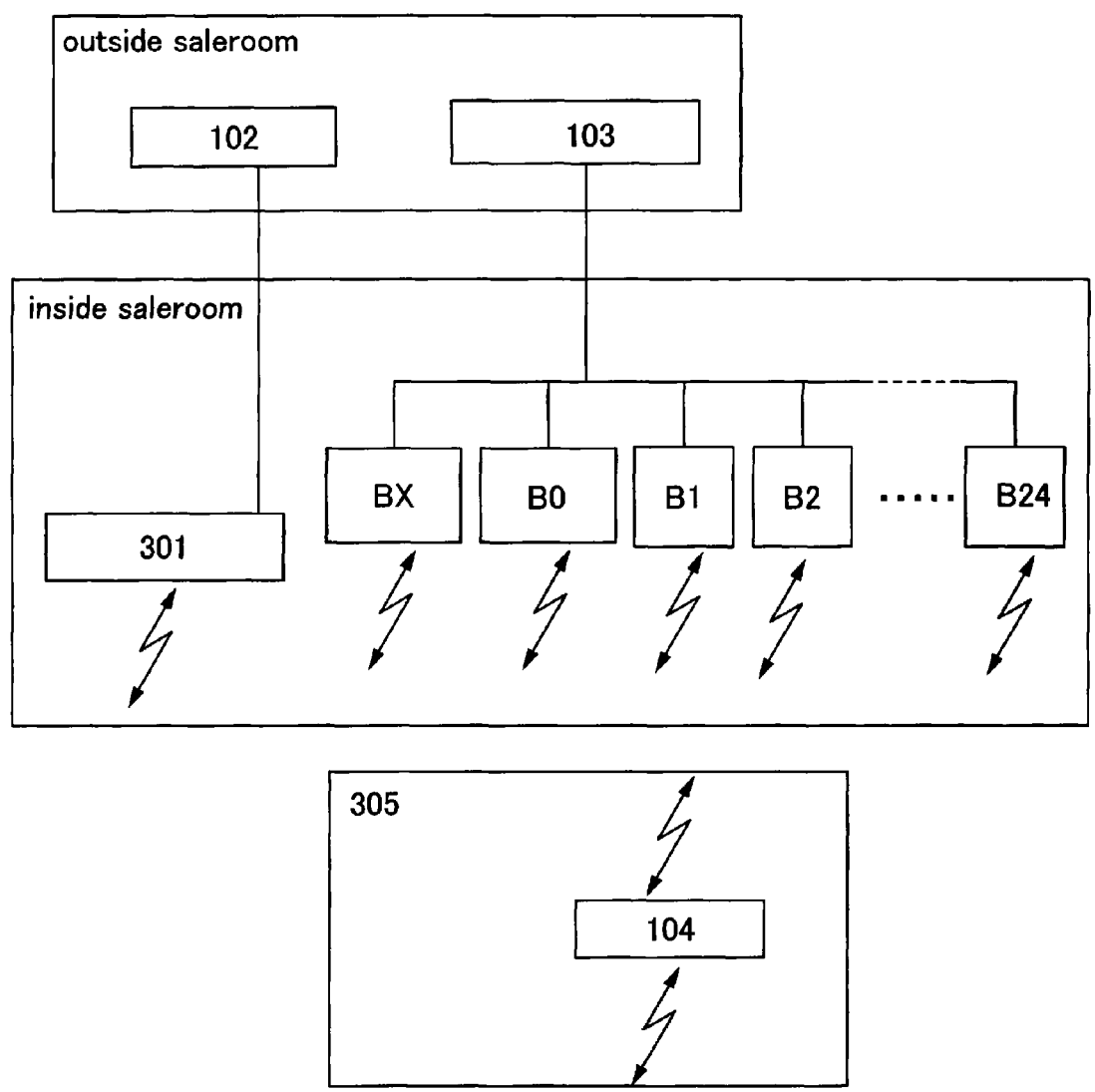
FIG. 13 is a view showing a survey system of an eighth embodiment mode.

FIG. 13 shows a survey system in the event site having a structure shown in FIG. 12. An antenna B0 in a site entrance, antennas B1 to B24 in a site, an antenna BX in a site exit, and an information processor 301 are arranged inside the site. A database 102 and a time control device 103 are arranged outside the site. Further, an object 305 such as a ticket, an entrance ticket, a member's card, or a coupon ticket, equipped with a wireless chip 104 is prepared.

Figure 14A:
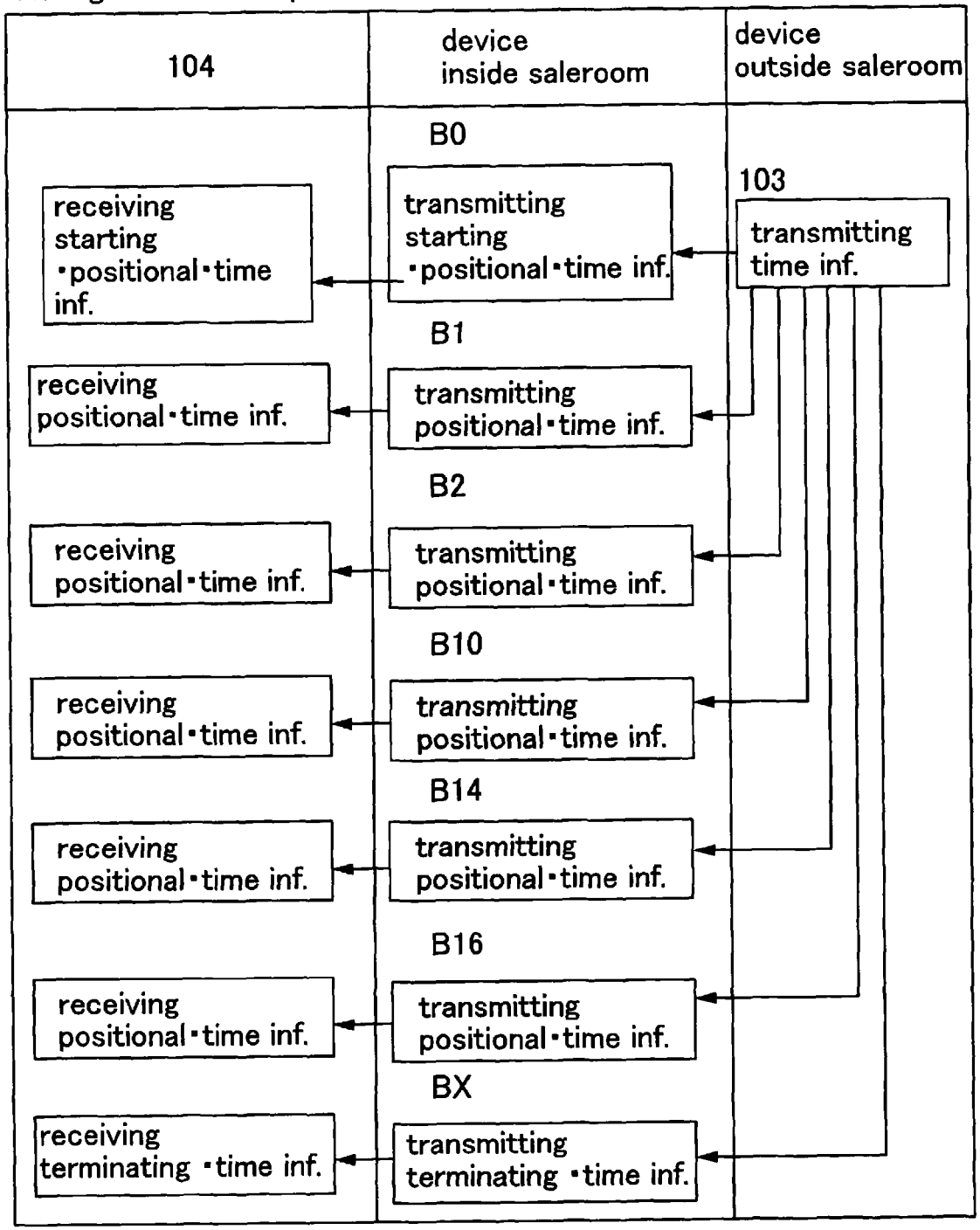
FIGS. 14 A and 14 B are a view showing a survey method of an eighth embodiment mode.

FIGS. 14A and 14B show a survey method using a survey system shown in FIG. 13. It is to be noted that an information erasing operation of a wireless chip 104 is not always required in the case where a object 305 such as a ticket, an entrance ticket, a member's card, or a coupon ticket is equipped with the wireless chip 104.

Figure 15:
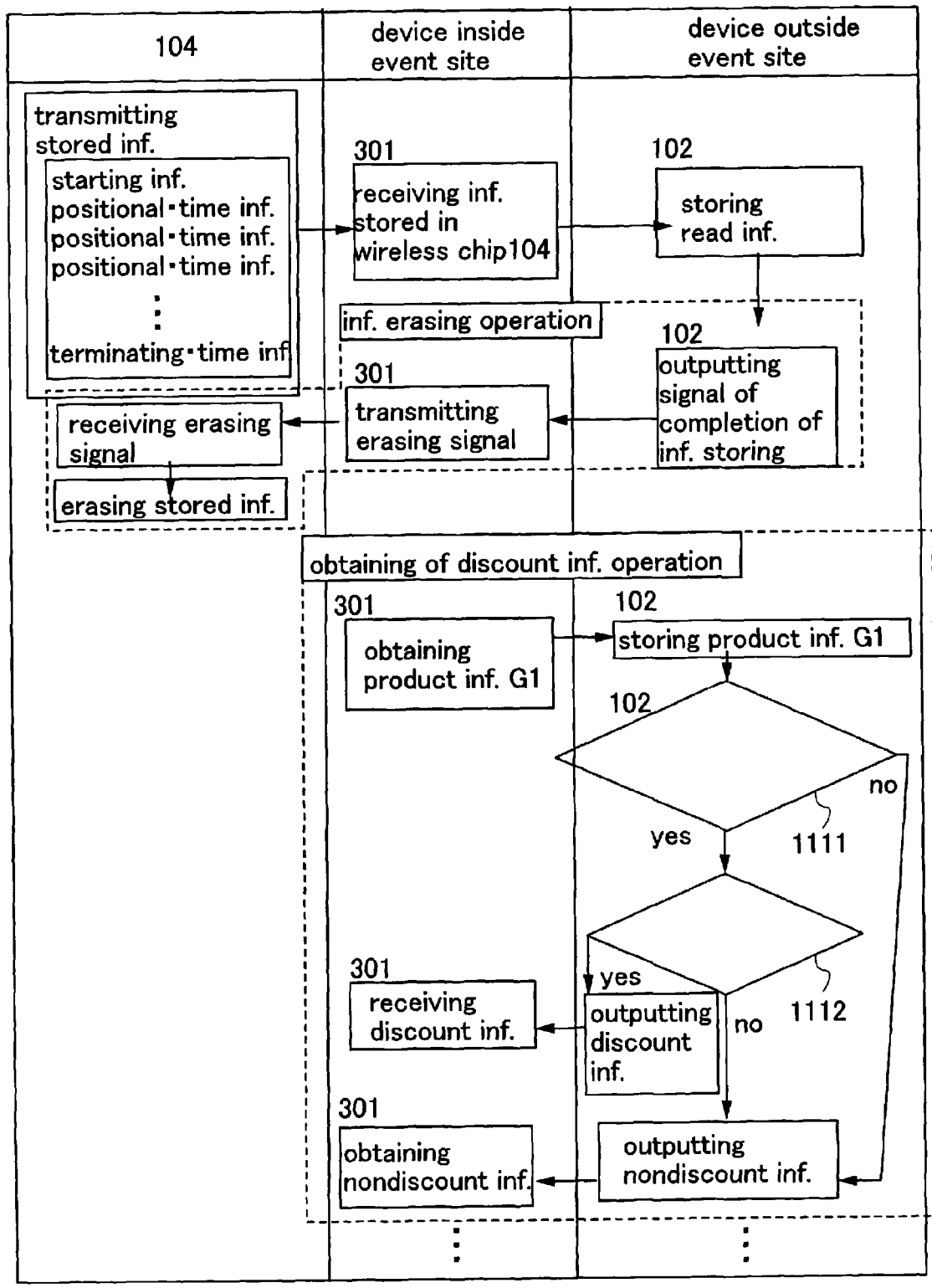
FIG. 15 is a view showing a survey method of an eighth embodiment mode.

FIG. 15 shows a survey method in the case of applying the sixth embodiment mode to an event site. Thus, the invention can be applied to discount hours in the event site.

In the survey system of this embodiment mode, a means by which whether or not a person coming to the site writes information in the wireless chip 104 can be selected by the person coming to the site can be provided. For example, a metal case covering the object 305 may be provided so that information is not written in the wireless chip 104.

This embodiment mode can be freely combined with the first embodiment mode to the seventh embodiment mode.

Embodiment Mode 9

In this embodiment mode, an antitheft method will be explained, which can be applied to a case where a wireless chip is attached to a product and product information is read from the wireless chip in the fifth embodiment mode and the sixth embodiment mode.

An antenna (antenna in a store exit), an information erasing device, and an alarm device are provided in an exit of a store. A wireless chip is attached to a product displayed in the store. A payment information processor for transmitting information telling that a product is paid (payment information) to the wireless chip is provided for a register device.

Information telling that a product is unpaid (nonpayment information) is written in a wireless chip attached to an unpaid product. In the case where a product having a wireless chip in which nonpayment information is recorded is taken out of the store by a person coming to the store, the antenna in the store exit receives the nonpayment information from the wireless chip. When the antenna in the store exit receives the nonpayment information, an alarm sounds from the alarm device. Thus, an unpaid product can be prevented from taken out of the store, and accordingly, the theft of a product can be prevented.

When a product is paid, the payment information processor transmits payment information to a wireless chip attached to the product. The wireless chip receives the payment information, and nonpayment information is rewritten into the payment information. In the case where a product having a wireless chip in which the payment information is recorded is taken out of the store by a person coming to the store, the antenna in the store exit receives the payment information from the wireless chip. When the antenna in the store exit receives the payment information, the information erasing device produces a signal (erasing signal) for erasing all pieces of information recorded in the wireless chip. The erasing signal is transmitted from the antenna in the store exit to the wireless chip. When the erasing signal is received by the wireless chip, all pieces of information recorded in the wireless chip are erased. Thus, an alarm can be made not to sound even when a paid product is taken out of the store by a person coming to the store. Further, information on the product can be prevented from being easily obtained by a third person after a person coming to the store takes a purchased product out of the store, and accordingly, privacy of the person coming to the store can be protected.

An example is shown, in which an erasing signal is outputted from an information erasing device and the erasing signal is transmitted from an antenna in a store exit to a wireless chip attached to a product; however, the invention is not limited thereto. Instead of the information erasing device, a means for destroying the wireless chip so that information cannot be given/received after receiving payment information may be provided.

Further, an example is shown, in which all pieces of information stored in a wireless chip attached to a product are erased and the wireless chip is destroyed in the doorway of the store; however, the invention is not limited thereto. All pieces of information stored in a wireless chip attached to a product may be erased and the wireless chip may be destroyed by a register device after the product is paid.

This embodiment mode can be freely combined with the seventh embodiment mode and the eighth embodiment mode.

Embodiment 1

In this embodiment, a configuration and an operating method of a wireless chip in a survey method and a survey system of the invention will be explained.

Figure 20:
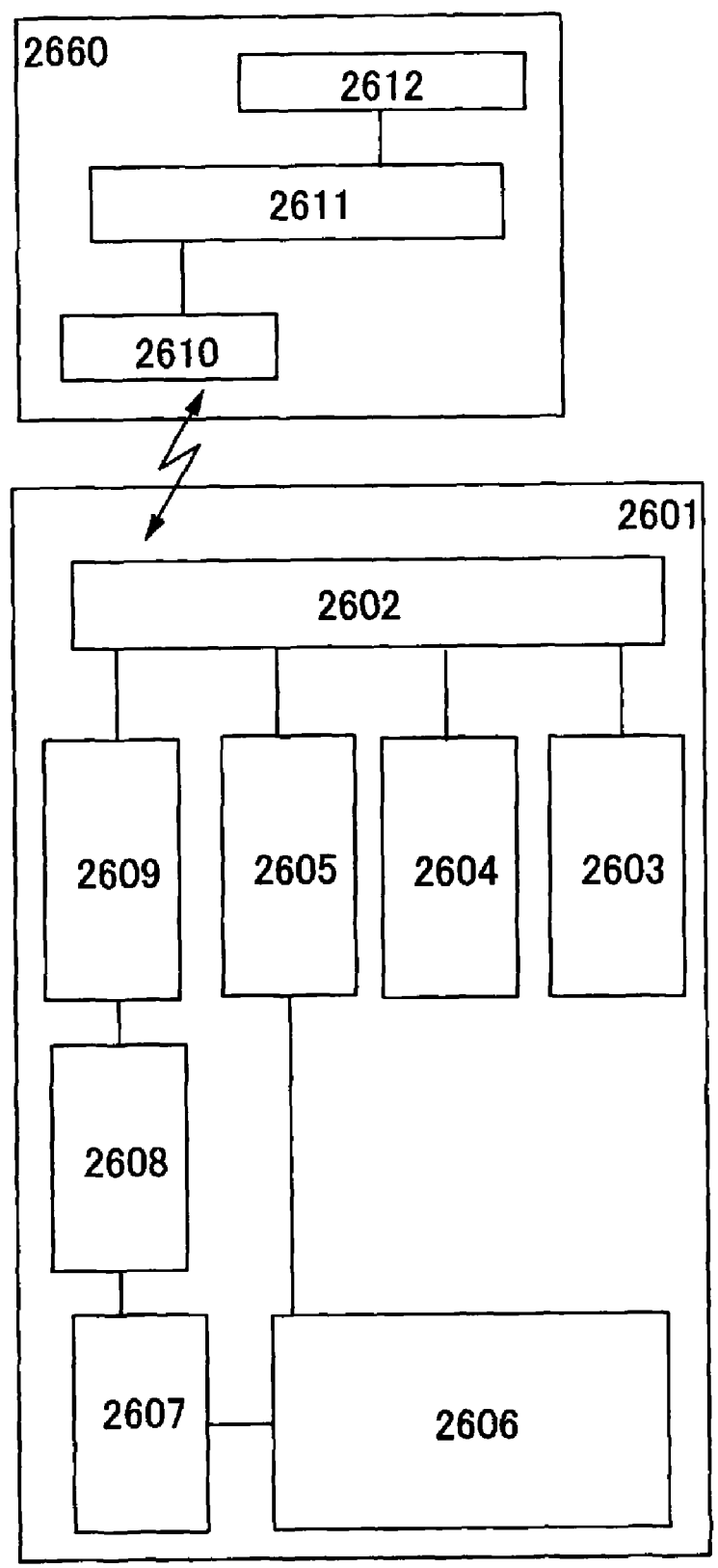
FIG. 20 is a diagram showing a configuration of a wireless chip and a circuit for conducting a wireless communication of a wireless chip.

FIG. 20 shows a configuration example of a wireless chip of the invention. A wireless chip 2601 has a resonant circuit 2602 having an antenna and a resonant capacitor, a power supply circuit 2603, a clock generation circuit 2604, a demodulation circuit 2605, a control circuit 2606, a memory device 2607, an encoding circuit 2608, and a modulation circuit 2609. The wireless chip 2601 is not limited to the above configuration, and a central processing arithmetic and logic unit (CPU), a congestion control circuit, or the like may be included.

A circuit for conducting giving and receiving of information by wireless communication with respect to the wireless chip 2601 is shown by a circuit 2660 in FIG. 20. The circuit 2660 is provided for each information processor, an antenna in a saleroom entrance, an antenna in a saleroom exit, an antenna in a saleroom, an antenna in a site entrance, an antenna in a site exit, an antenna in a site, an antenna in a store exit, and a payment information processor in the first embodiment mode to the ninth embodiment mode.

The wireless chip 2601 can conduct transmission/reception of information to a R/W (reader/writer device) 2610 without wire while electric power is supplied from an electromagnetic wave emitted from the R/W (reader/writer device) 2610 of the circuit 2660 by the resonant circuit 2602 having the antenna. The R/W (reader/writer device) 2610 is connected to an information processing portion 2612 through a R/W interface portion 2611, and accordingly, information can be transmitted/received by the control of the information processing portion 2612.

The resonant circuit 2602 has a function of receiving an electromagnetic wave emitted from the R/W (reader/writer device) 2610 and generating an induced voltage. The induced voltage becomes an electric power of the wireless chip 2601 and includes information transmitted from the R/W (reader/writer device) 2610. The power supply circuit 2603 has a function of rectifying the induced voltage generated in the resonant circuit 2602 by a diode, smoothing it by using a capacitor, and supplying it to each circuit. The clock generation circuit 2604 has a function of producing a clock signal with necessary frequency, based on the induced voltage generated in the resonant circuit 2602. The demodulation circuit 2605 has a function of demodulating information from the induced voltage generated in the resonant circuit 2602. The control circuit 2606 has a function of controlling the memory device 2607. Therefore, the control circuit 2606 includes the generation of a memory control signal, an information determination circuit which calculates information transmitted from the R/W (reader/writer device) 2610 to determine right or wrong thereof, and the like. The encoding circuit 2608 converts information possessed by the memory device 2607 into an encoding signal. The modulation circuit 2609 has a function of modulating a carrier wave based on the encoding signal.

Figure 16:
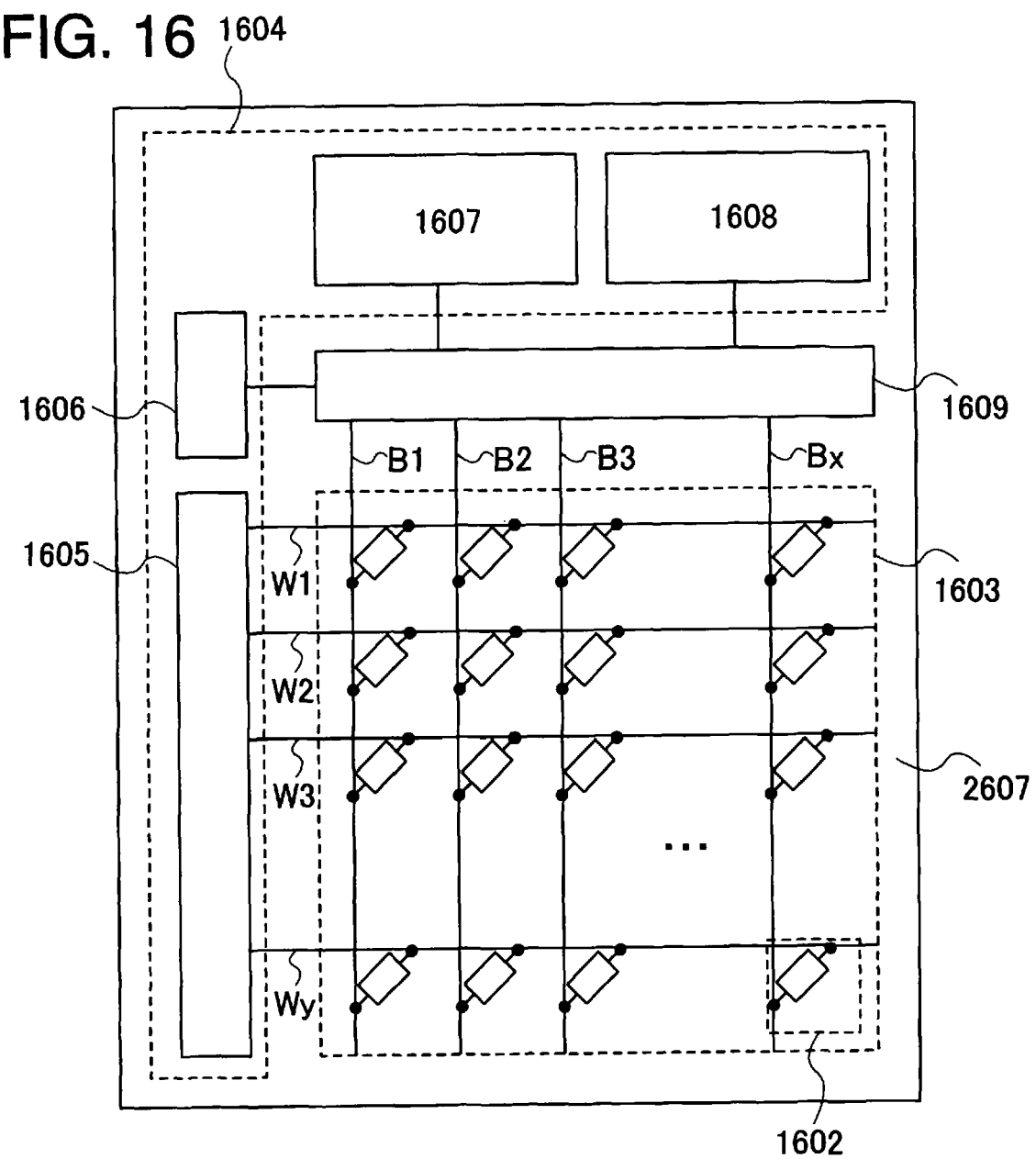
FIG. 16 is a diagram showing a configuration of a wireless chip.

One example of the memory device 2607 of the wireless chip 2601 in FIG. 20 will be explained with reference to FIG. 16. A memory device 2607 has a memory cell array 1603 in which a plurality of memory cells 1602 are formed in matrix, and a control circuit 1604 for controlling writing of a signal to the memory cell array 1603 and reading of a signal from the memory cell array 1603. The control circuit 1604 has a y decoder 1605, an x decoder 1606, a reading circuit 1607, a writing circuit 1608, and a selector 1609.

The memory cell array 1603 has bit lines B1 to Bx and word lines W1 to Wy, and a memory cell 1602 is provided at each intersection portion of the bit lines B1 to Bx and the word lines W1 to Wy. The memory cell 1602 may be an active type with a switching element such as a transistor, or a passive type without the switching element.

The x decoder 1606 receives an address signal (referred to as x address signal) which specifies an arbitrary bit line of the bit lines B1 to Bx to give a signal to the selector 1609. The selector 1609 receives the signal of the x decoder 1606 to select a specified bit line. The y decoder 1605 receives an address signal (referred to as y address signal) which specifies an arbitrary word line of the word lines W1 to Wy to select a specified word line. Thus, the memory cell 1602, which is settled by the x address signal and the y address signal, is selected. The reading circuit 1607 reads, preferably amplifies, information possessed by the selected memory cell 1602 to output. The writing circuit 1608 produces a voltage necessary for writing and applies a voltage to the selected memory cell 1602, and accordingly, information is written.

Next, an example of a circuit configuration of the memory cell 1602 will be explained. An example of an active type memory cell using a transistor as a switching element is shown.

Figure 17A:
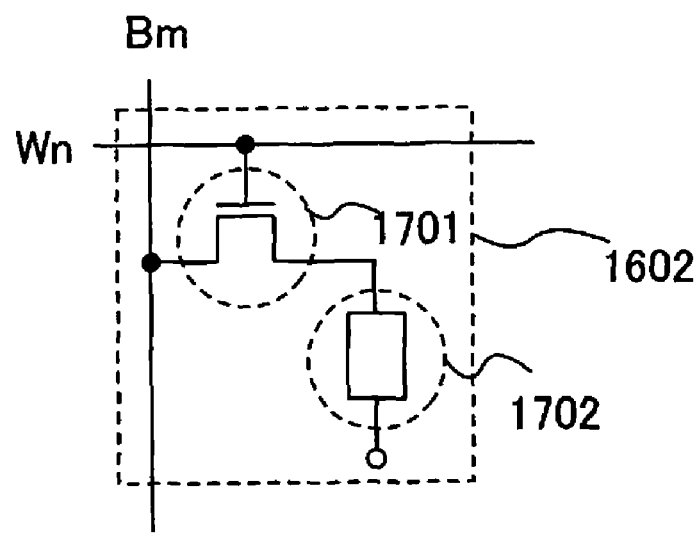
FIGS. 17A and 17B are diagrams each showing a configuration of a memory cell.

FIG. 17A shows one example of the memory cell 1602. In FIG. 17A, a memory cell 1602 has a transistor 1701 and a memory element 1702. A thin film transistor can be used as the transistor 1701. The memory element 1702 has two electrodes which are opposed to each other, and a memory layer interposed between these electrodes.

A gate of the transistor 1701 is connected to an arbitrary word line Wn (n is a natural number of 1 or more to y or less) of word lines W1 to Wy. One of a source and a drain of the transistor 1701 is connected to an arbitrary bit line Bm (m is a natural number of 1 or more to x or less) of bit lines B1 to Bx, and the other is connected to one of the electrodes of the memory element 1702. The other electrode of the memory element 1702 can be shared in the memory element 1702 included in a plurality of memory cells 1602, respectively.

Figure 17B:
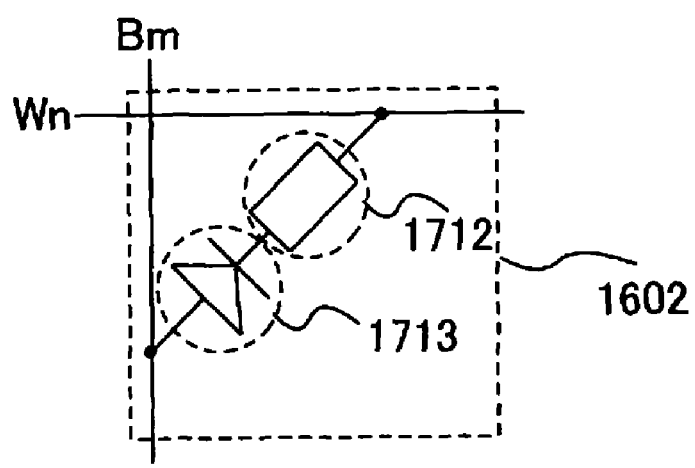

FIG. 17B shows another example of a memory cell 1602 which is different from the one shown in FIG. 17A. In FIG. 17B, a configuration in which a memory element 1712 and a diode 1713 are connected in series, instead of the memory element 1702 in FIG. 17A, is employed. As the diode 1713, a transistor in which a drain and a gate are connected to each other (so-called diode-connected) can be used. In addition, as the diode 1713, a Schottky diode by a contact of a memory layer of the memory element and one of electrodes of the memory element can be used, or diode characteristics by a contact between memory layers can be utilized.

The memory layer has lower conductivity compared with two electrodes interposing the memory layer therebetween, and a material which is changed in the property or condition thereof by an electric action, an optical action, or a thermal action can be used. For example, a material which can make two electrodes interposing the memory layer therebetween short-circuited by the change in the property or condition thereof due to melting by Joule heat, dielectric breakdown, or the like can be used. Therefore, the memory layer may have a thickness of from 5 nm to 100 nm, preferably, from 10 nm to 60 nm. The memory layer can be made of an inorganic material or an organic material, and can be formed by a vapor deposition method, a spin coating method, a droplet discharge method, or the like.

As the inorganic material, silicon oxide, silicon nitride, silicon oxynitride, or the like can be used. Also by using such an inorganic material, dielectric breakdown can be generated by controlling the thickness thereof and two electrodes interposing the memory layer therebetween can be short-circuited.

As the organic material, for example, an aromatic amine-based (that is, a bond of benzene ring—nitrogen is included) compound such as 4,4'-bis[N-(1-naphthyl)-N-phenylamino]biphenyl (abbreviated to α-NPD), 4,4'-bis[N-(3-methylphenyl)-N-phenylamino]biphenyl (abbreviated to TPD), 4,4',4"-tris(N,N-diphenylamino)triphenylamine (abbreviated to TDATA), 4,4',4"-tris[N-(3-methylphenyl)-N-phenylamino]triphenylamine (abbreviated to MTDATA), or 4,4'-bis(N-(4-(N,N-di-m-tolylamino)phenyl)-N-phenylamino)biphenyl (abbreviated to DNTPD); polyvinyl carbazole (PVK); a phthalocyanine compound such as phthalocyanine (abbreviated to $H_2Pc$), copper phthalocyanine (abbreviated to CuPc), or vanadyl phthalocyanine (abbreviated to VOPc); or the like can be used. These materials are substances having a high hole transporting property.

The organic material preferably has a high glass transition temperature (Tg) from 50° C. to 300° C., preferably 80° C. to 120° C., so that the property of the organic material is changed by a thermal effect or the like.

Further, as the organic material, for example, a material made of a metal complex or the like having a quinoline skeleton or a benzoquinoline skeleton, such as tris(8-quinolinolato) aluminum (abbreviated to $Alq_3$), tris(4-methyl-8-quinolinolato) aluminum (abbreviated to $Almq_3$), bis(10-hydroxybenzo[h]-quinolinato) beryllium (abbreviated to $BeBq_2$), or bis(2-methyl-8-quinolinolato)-4-phenylphenolato-aluminum (abbreviated to BAlq) or a material such as a metal complex having an oxazole-based or thiazole-based ligand, such as bis[2-(2-hydroxyphenyl)benzoxazolato]zinc (abbreviated to $Zn(BOX)_2$) or bis[2-(2-hydroxyphenyl)benzothiazolato]zinc (abbreviated to $Zn(BTZ)_2$) can be used. These materials are substances having a high electron transporting property.

Furthermore, in addition to a metal complex, a compound or the like such as 2-(4-biphenylyl)-5-(4-tert-butylphenyl)-1,3,4-oxadiazole (abbreviated to PBD), 1,3-bis[5-(p-tert-butylphenyl)-1,3,4-oxadiazole-2-yl]benzene (abbreviated to OXD-7), 3-(4-tert-butylphenyl)-4-phenyl-5-(4-biphenylyl)-1,2,4-triazole (abbreviated to TAZ), 3-(4-tert-butylphenyl)-4-(4-ethylphenyl)-5-(4-biphenylyl)-1,2,4-triazole (abbreviated to p-EtTAZ), bathophenanthroline (abbreviated to BPhen), or bathocuproin (abbreviated to BCP) can be used.

The memory layer may be a single layer structure or a laminated structure. In case of a laminated structure, a laminated structure can be formed by selecting from the above materials. The above organic material and a light-emitting material may be stacked. As a light-emitting material, 4-dicyanomethylene-2-methyl-6-[2-(1,1,7,7-tetramethyljulolidine-9-yl)ethenyl]-4H-pyran (abbreviated to DCJT), 4-dicyanomethylene-2-t-butyl-6-[2-(1,1,7,7-tetramethyljulolidine-9-yl)ethenyl]-4H-pyran, periflanthene, 2,5-dicyano-1,4-bis[2-(10-methoxy-1,1,7,7-tetramethyljulolidine-9-yl)ethenyl]benzene, N,N'-dimethylquinacridone (abbreviated to DMQd), coumarin 6, coumarin 545T, tris(8-quinolinolato) aluminum (abbreviated to Alq$_3$), 9,9'-bianthlyl, 9,10-diphenylanthracene (abbreviated to DPA), 9,10-bis (2-naphthyl) anthracene (abbreviated to DNA), 2,5,8,11-tetra-t-buthylperylene (abbreviated to TBP), and the like are given.

A layer in which the above light-emitting material is dispersed may be used. In the layer in which the above light-emitting material is dispersed, an anthracene derivative such as 9,10-di(2-naphthyl)-2-tert-butylanthracene (abbreviated to t-BuDNA); a carbazole derivative such as 4,4'-bis(N-carbazolyl)biphenyl (abbreviated to CBP); a metal complex such as bis[2-(2-hydroxyphenyl)pyridinato]zinc (abbreviated to Znpp$_2$) or bis[2-(2-hydroxyphenyl)benzoxazolate]zinc (abbreviated to ZnBOX); or the like can be used as a host material. In addition, tris(8-quinolinolato) aluminum (abbreviated to Alq$_3$), 9,10-bis(2-naphthyl) anthracene (abbreviated to DNA), bis(2-methyl-8-quinolinolato)-4-phenylphenolate-aluminum (abbreviated to BAlq), or the like can be used.

In addition, a material in which metal oxide is mixed with an organic material or a light-emitting material may be used. Note that the material in which metal oxide is mixed includes a state in which metal oxide is mixed with the above organic material or the above light-emitting material. Specifically, it indicates a state which is formed by a co-evaporation method using multiple evaporation sources. Such a material can be referred to as an organic-inorganic composite material.

For example, in the case of mixing a substance having a high hole transporting property with a metal oxide, it is preferable to use vanadium oxide, molybdenum oxide, niobium oxide, rhenium oxide, tungsten oxide, ruthenium oxide, titanium oxide, chromium oxide, zirconium oxide, hafnium oxide, and tantalum oxide as the metal oxide.

In the case of mixing a substance having a high electron transporting property with a metal oxide, lithium oxide, calcium oxide, sodium oxide, kalium oxide, or magnesium oxide is preferably used as the metal oxide.

A material which is changed in its property by an optical effect, an electric effect, or a thermal effect can be used for the memory layer; therefore, for example, a conjugated polymer doped with a compound (photoacid generator) generating acid by means for absorbing light can also be used. Here, as the conjugated polymer, polyacetylenes, polyphenylene vinylenes, polythiophenes, poly anilines, polyphenylene ethinylenes, or the like can be used. As the photoacid generator, aryl sulfonium salt, aryl iodonium salt, o-nitrobenzyl tosylate, aryl sulfonic acid p-nitrobenzyl ester, sulfonyl acetophenones, Fe-arene complex PF$_6$ salt, or the like can be used.

Next, an operation at the time of writing a signal to an active type memory cell 1602 shown in FIG. 17A will be explained. FIG. 16 is also used in the explanation. In this embodiment mode, an initial state of a memory element 1702 is denoted by a logical value "0" and a state in which a memory layer is destroyed by an electric effect or the like and two electrodes interposing the memory layer are short-circuited is a logical value "1".

A bit line Bm in m-th (m is a natural number of 1 or more to x or less) column and a word line Wn in n-th (n is a natural number of 1 or more to y or less) row are selected by an x decoder 1606, a y decoder 1605, and a selector 1609. Thus, a transistor 1701 included in the memory cell 1602 in m-th column and n-th row turns on.

Subsequently, a predetermined voltage is applied to the bit line Bm in m-th column by a writing circuit 1608. A voltage applied here has a voltage value by which two electrodes interposing the memory layer of the memory element 1702 are short-circuited. The voltage applied to the bit line Bm in m-th column is transmitted to one of the two electrodes of the memory element 1702 through the transistor 1701, which results in potential difference between the electrode and the other electrode. Then, a large amount of current flows in the memory element 1702, a state of the memory layer is changed, and the two electrodes are short-circuited. As described above, a voltage is applied to the memory element 1702 and a state is changed from the logical value "0" to the logical value "1" to write information.

Figure 18:
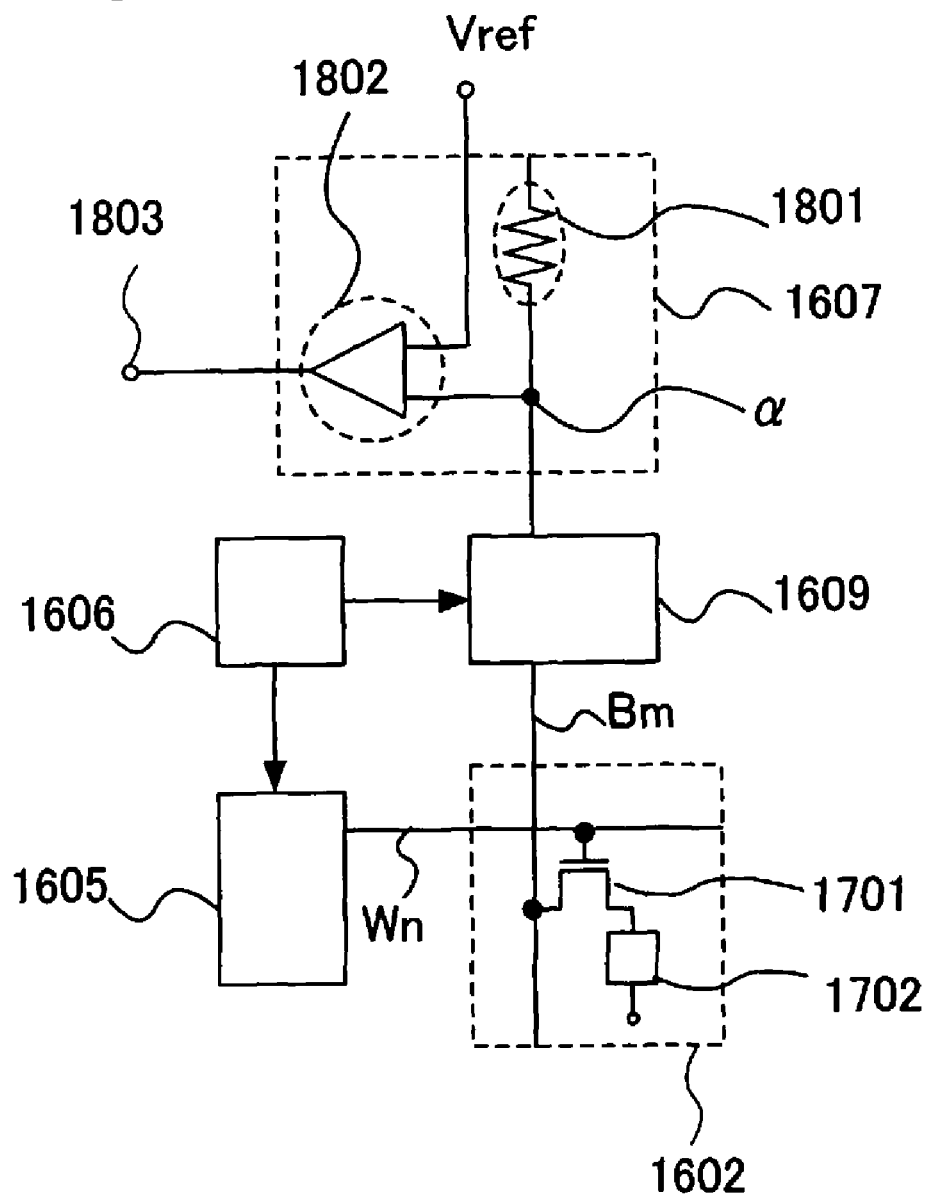
FIG. 18 is a diagram showing a configuration of a circuit for reading information from a memory cell.

Next, an operation of reading information written in the memory cell 1602 will be explained. As shown in FIG. 18, a reading circuit 1607 has a resistance element 1801 and a sense amplifier 1802. A predetermined voltage is applied to a terminal in the opposite side of node α among a pair of terminals of the resistance element 1801. Information is read by reading a state of a memory layer with a voltage applied between two electrodes interposing the memory layer of the memory element 1702. Specifically, information is read by electrically reading a resistance value of a memory layer. For example, a case of reading information of the memory element 1702 in m-th column and n-th row from a plurality of memory elements 1702 included in a memory cell array 1603 will be explained. First, a bit line Bm in m-th column and a word line Wn in n-th row are selected by an x decoder 1606, a y decoder 1605, and a selector 1609. Thus, a transistor 1701 included in the memory cell 1602 arranged in m-th column and n-th row turns on, and accordingly, the memory element 1702 and the resistance element 1801 are connected in series. At this time, the memory element 1702 can be regarded as one resistance element. Therefore, the memory element 1702 and the resistance element 1801 are regarded as two resistance elements connected in series, and when a predetermined voltage is applied to both ends thereof, an electric potential of node a of the sense amplifier 1802 becomes an electric potential in which resistance division is conducted according to a resistance value of the memory element 1702.

The electric potential of node a is supplied to the sense amplifier 1802. Whether the selected memory cell 1602 has a logical value "0" or a logical value "1" is discriminated by comparing the electric potential and a reference voltage Vref in the sense amplifier 1802. Thus, information written in the memory cell 1602 is read from a terminal 1803.

In the above-described way, information is read by a voltage value by utilizing resistance division and a difference in resistance value between a case where the memory element 1702 has information of a logical value "0" and a case where the memory element 1702 has information of a logical value "1". However, information possessed by the memory element 1702 may be read by a current value.

The reading circuit 1607 of the invention is not limited to the above configuration, and any configuration may be acceptable as long as information of the memory element 1702 can be read.

The memory element shown in FIGS. 17A and 17B and FIG. 18 is an additional writing type because a state is changed from a logical value "0" to a logical value "1". The change from a logical value "0" to a logical value "1" is irreversible; therefore, the memory element becomes a memory element in which rewritten cannot be conducted. Hence, in a survey system of the invention, in the case where a wireless chip using a memory element shown in FIGS. 17A and 17B and FIG. 18 is utilized, the wireless chip is disposable.

The embodiment can be freely combined with the first embodiment mode to the ninth embodiment mode.

Embodiment 2

In this embodiment, a cross-sectional structure of a wireless chip will be explained. In the explanation, a reference number in FIG. 16 and FIGS. 17A and 17B will be used.

Figure 19A:
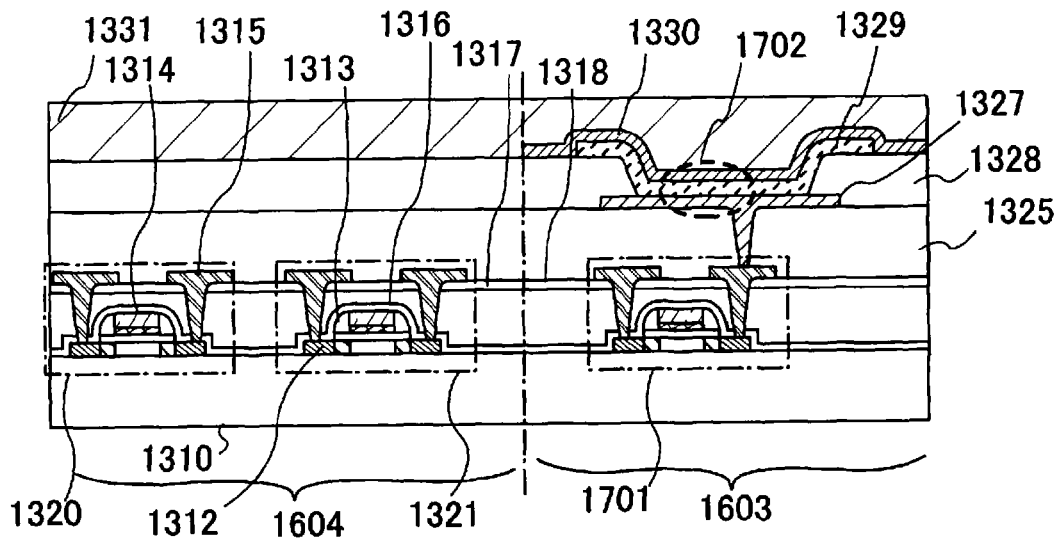
FIGS. 19A and 19B are cross-sectional views each showing a structure of a wireless chip.

FIG. 19A shows a cross sectional view of a wireless chip in which a memory device and a control circuit portion are formed over the same insulating surface, which is an insulating surface 1310, is shown. As an insulating surface 1310, a substrate surface of an insulating substrate such as a glass substrate, a quartz substrate, or a plastic substrate; or a surface of an insulating film formed over a conductive substrate such as a substrate made of silicon or a metal substrate can be used.

A thin film transistor of a control circuit 1604 and a thin film transistor of a memory cell array 1603 are formed on the insulating surface 1310. A thin film transistor 1320 and a thin film transistor 1321 are shown as the representative of a thin film transistor of a control circuit portion 1302 in FIG. 19A. A transistor 1701 which is provided for each memory cell 1602 and is connected to a memory element is shown as the representative of a thin film transistor of the memory cell array 1603. Each thin film transistor has a semiconductor film 1312 formed in an island shape, a gate insulating film, a gate electrode 1314 provided on the semiconductor film 1312 through the gate insulating film, and an insulator (so-called sidewall 1313) provided on a side face of the gate electrode 1314. The semiconductor film 1312 is formed so as to have a film thickness of 0.2 μm or less, typically, from 40 nm to 170 nm, preferably, from 50 nm to 150 nm. Further, each transistor has the sidewall 1313, an insulating film 1316 for covering the semiconductor film 1312, and an electrode 1315 which is connected to a region (impurity region) added with an impurity element which imparts conductivity in the semiconductor film 1312. The electrode 1315 can be formed by forming a contact hole reaching the impurity region in the gate insulating film and the insulating film 1316, forming a conductive film in the contact hole, and processing the conductive film into a predetermined shape.

An insulating film 1317 and an insulating film 1318 may be provided to enhance flatness. The insulating film 1317 is preferably made of an organic material, and the insulating film 1318 may be made of an inorganic material. In the case where the insulating film 1317 and the insulating film 1318 are provided, a contact hole is formed reaching the impurity region in the gate insulating film, the insulating film 1316, the insulating film 1317, and insulating film 1318. The electrode 1315 can be formed by forming a conductive film in the contact hole and processing the conductive film into a predetermined shape.

An insulating film 1325 is provided on the electrode 1315, and a first electrode 1327 is formed so as to be connected to the electrode 1315. An insulating film 1328, in which an opening portion is provided so as to expose a part of the first electrode 1327, is formed to cover an edge portion of the first electrode 1327. A memory layer 1329 is formed in the opening, and a second electrode 1330 is formed on the memory layer 1329. Thus, a memory element 1702 having the first electrode 1327, the memory layer 1329, and the second electrode 1330 is formed. The memory layer 1329 can be made of an organic material or an inorganic material. The first electrode 1327 or the second electrode 1330 can be made of a conductive material, for example, a film made of an element of aluminum (Al), titanium (Ti), molybdenum (Mo), tungsten (W), or silicon (Si) or an alloy film or the like using these elements. Further, indium tin oxide (ITO), indium tin oxide containing silicon oxide, or a material formed by using a target in which 2 to 20 wt % zinc oxide is mixed into indium oxide can be used.

An insulating film 1331 is preferably formed on the second electrode 1330 to enhance flatness more and to prevent the intrusion of an impurity element.

As the insulating film, an inorganic material or an organic material can be used. Silicon oxide or silicon nitride can be used for the inorganic material. As the organic material, polyimide, acrylic, polyamide, polyimide amide, resist, benzocyclobutene, siloxane, or polysilazane can be used. Siloxane is a resin including a bond of silicon (Si) and oxygen (O), and skeleton structure is formed by the bond of silicon (Si) and oxygen (O). As a substituent included in siloxane, an organic group containing at least hydrogen (for example, alkyl group or aromatic hydrocarbon) is used. Alternatively, a fluoro group may be used as the substituent. Further alternatively, a fluoro group and an organic group containing at least hydrogen may be used as the substituent. Polysilazane is formed by using a polymer material having a bond of silicon (Si) and nitrogen (N) as a starting material.

Figure 19B:
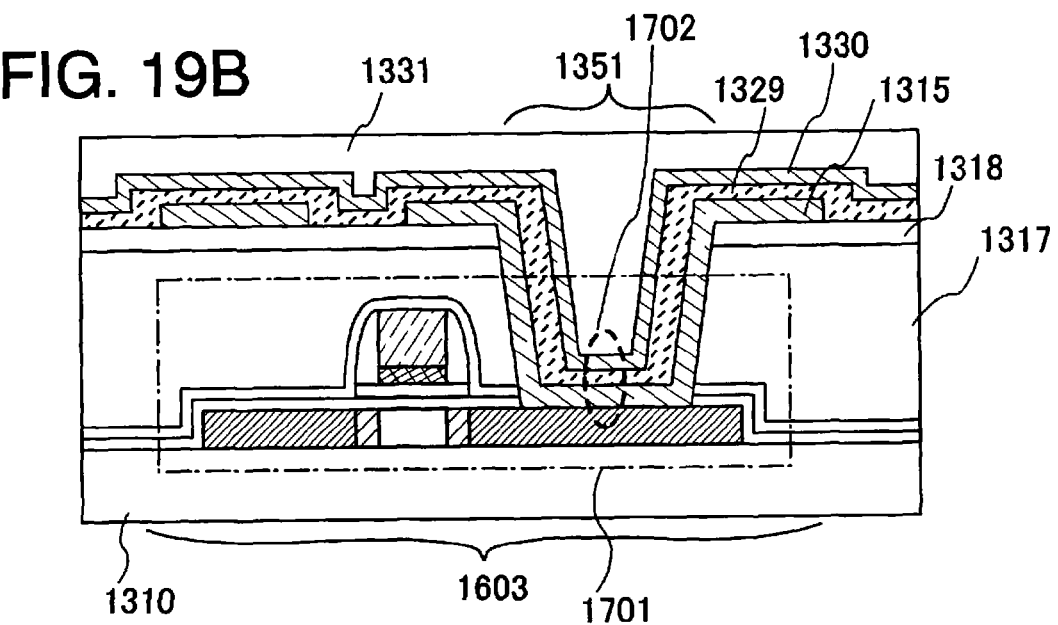

FIG. 19B shows an example in which the insulating film 1325 is not formed in FIG. 19A, an electrode 1315 is made to be one of a pair of electrodes of the memory element, and a memory element is formed in a contact hole 1351. The electrode 1315 is used as the first electrode, a memory layer 1329 and a second electrode 1330 are formed on the electrode 1315, and a memory element 1702 is formed. Thereafter, an insulating film 1331 is formed. The structure of other parts is similar to FIG. 19A; therefore, the explanation is omitted.

By forming the memory element 1702 in the contact hole 1351 as shown in FIG. 19B, small size of a wireless chip can be attained. Further, a wireless chip of low cost by reducing a manufacturing process can be provided.

In this embodiment, the memory cell array and the control circuit portion can be formed by using thin film transistors formed on the same insulating surface at the same time; therefore, a manufacturing cost of the wireless chip can be reduced.

This embodiment can be freely combined with Embodiment Modes 1 to 9 and Embodiment 1. This application is based on Japanese Patent Application serial No. 2005-091804 field in Japan Patent Office on Mar. 28th, 2005, the entire contents of which are hereby incorporated by reference.

What is claimed is:

1. A survey method comprising the steps of:
arranging an object equipped with a wireless chip having a memory device, the object being capable of being transported by a user;
writing, into the memory device, information indicating an entrance of the object into a saleroom, wherein the writing of the information indicating the entrance is wirelessly performed;
writing, into the memory device, information indicating a location of the object in the saleroom, wherein the writing of the information indicating the location is wirelessly performed;
writing, into the memory device, information indicating an exit of the object from the saleroom, wherein the writing of the information indicating the exit is wirelessly performed; and analyzing information stored in the memory device, wherein the memory device comprises a memory layer comprising an organic material sandwiched between a pair of electrodes, and wherein the memory device is arranged to irreversibly undergo a short circuit between the pair of electrodes when a voltage is applied therebetween.

2. The survey method according to claim 1, wherein the object is a basket or a cart.

3. The survey method according to claim 1, wherein the organic material is an aromatic amine.

4. The survey method according to claim 1, wherein the organic material is doped with molybdenum oxide.

5. The survey method according to claim 4, wherein the organic material is in contact with each of the pair of electrodes.

6. The survey method according to claim 1, wherein the organic material is a conjugated polymer doped with a photoacid generator.

7. The survey method according to claim 6, wherein the organic material is in contact with each of the pair of electrodes.

8. The survey method according to claim 1, wherein the memory layer has a thickness from 5 to 100 nm.

9. A survey method comprising the steps of:

distributing an object to a user, wherein the object is capable of being transported by the user and is equipped with a wireless chip having a memory device;

writing, into the memory device, information indicating an entrance of the user to a site, wherein the writing of the information indicating the entrance is wirelessly performed;

writing, into the memory device, information indicating a location of the object in the site, wherein the writing of the information indicating the location is wirelessly performed;

writing, into the memory device, information indicating an exit of the object from the site, wherein the writing of the information indicating the exit is wirelessly performed; and analyzing information stored in the memory device, wherein the memory device comprises a memory layer comprising an organic material sandwiched between a pair of electrodes, and wherein the memory device is arranged to irreversibly undergo a short circuit between the pair of electrodes when a voltage is applied therebetween.

10. The survey method according to claim 9, wherein the object is a ticket that allows the user to enter the site.

11. The survey method according to claim 9, wherein the site is an event site.

12. The survey method according to claim 9, wherein the organic material is an aromatic amine.

13. The survey method according to claim 9, wherein the organic material is doped with molybdenum oxide.

14. The survey method according to claim 13, wherein the organic material is in contact with each of the pair of electrodes.

15. The survey method according to claim 9, wherein the organic material is a conjugated polymer doped with a photoacid generator.

16. The survey method according to claim 15, wherein the organic material is in contact with each of the pair of electrodes.

17. The survey method according to claim 9, wherein the memory layer has a thickness from 5 to 100 nm.

* * * * *